(12) United States Patent
Oh et al.

(10) Patent No.: US 9,319,743 B2
(45) Date of Patent: Apr. 19, 2016

(54) METHOD AND APPARATUS FOR PROCESSING DIGITAL SERVICE SIGNAL

(71) Applicant: LG ELECTRONICS INC., Seoul (KR)

(72) Inventors: Sejin Oh, Seoul (KR); Deokhyun Kim, Seoul (KR); Jaeseung Ko, Seoul (KR); Jongsung Choi, Seoul (KR); Kyoungsoo Moon, Seoul (KR); Jinpil Kim, Seoul (KR); Youngmu Kwon, Seoul (KR); Sungguk Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/091,895

(22) Filed: Nov. 27, 2013

(65) Prior Publication Data

US 2014/0150048 A1 May 29, 2014

Related U.S. Application Data

(60) Provisional application No. 61/730,062, filed on Nov. 27, 2012.

(51) Int. Cl.
*H04N 7/173* (2011.01)
*H04N 21/443* (2011.01)
*H04N 21/81* (2011.01)
(Continued)

(52) U.S. Cl.
CPC ....... *H04N 21/4431* (2013.01); *H04N 21/2381* (2013.01); *H04N 21/435* (2013.01); *H04N 21/4345* (2013.01); *H04N 21/4383* (2013.01); *H04N 21/4622* (2013.01); *H04N 21/4722* (2013.01); *H04N 21/4782* (2013.01); *H04N 21/6125* (2013.01); *H04N 21/64322* (2013.01); *H04N 21/6581* (2013.01); *H04N 21/8166* (2013.01); *H04N 21/8173* (2013.01); *H04N 21/8455* (2013.01)

(58) Field of Classification Search
CPC .. H04N 21/435; H04N 21/8166; H04N 7/173
USPC ..................................... 725/37, 41, 45, 132
See application file for complete search history.

(56) References Cited

U.S. PATENT DOCUMENTS

2003/0208778 A1* 11/2003 Aratani et al. ............... 725/139
2010/0275227 A1  10/2010 Lee et al.

(Continued)

FOREIGN PATENT DOCUMENTS

JP       2009100006 A    5/2009
JP       2011223564 A    11/2011

*Primary Examiner* — Jivka Rabovianski
(74) *Attorney, Agent, or Firm* — Dentons US LLP

(57) ABSTRACT

A digital service signal apparatus is disclosed. The digital service signal apparatus includes a receiving module receiving signaling information having channel information for an application from the digital service signal, a generating module generating a request using the channel information, a sending module sending the generated request, a downloading module downloading the application, an executing module configured to execute the API related to the application and a registering module configured to register the specific key set according to the mode number.

21 Claims, 16 Drawing Sheets

(51) Int. Cl.
*H04N 21/434* (2011.01)
*H04N 21/4722* (2011.01)
*H04N 21/658* (2011.01)
*H04N 21/2381* (2011.01)
*H04N 21/435* (2011.01)
*H04N 21/438* (2011.01)
*H04N 21/462* (2011.01)
*H04N 21/4782* (2011.01)
*H04N 21/61* (2011.01)
*H04N 21/643* (2011.01)
*H04N 21/845* (2011.01)

(56) References Cited

U.S. PATENT DOCUMENTS

2010/0319036 A1   12/2010   Lim et al.
2010/0319043 A1   12/2010   Jain et al.
2011/0307833 A1   12/2011   Dale et al.

\* cited by examiner

FIG. 3

| Channel number | Start time | End time | Title | Application URL | ... |
|---|---|---|---|---|---|
| 9 - 1 | 2012-11-08-12:30 | 2012-11-08-13:30 | Drama | kbs.ohtv.org/drama | ... |
| 9 - 1 | 2012-11-08-13:30 | 2012-11-08-14:00 | News & weather | kbs.ohtv.org/news | ... |
| 9 - 1 | 2012-11-08-14:00 | 2012-11-08-15:00 | World Cup Finals | kbs.ohtv.org/sport | ... |
| ... | ... | ... | ... | ... | ... |

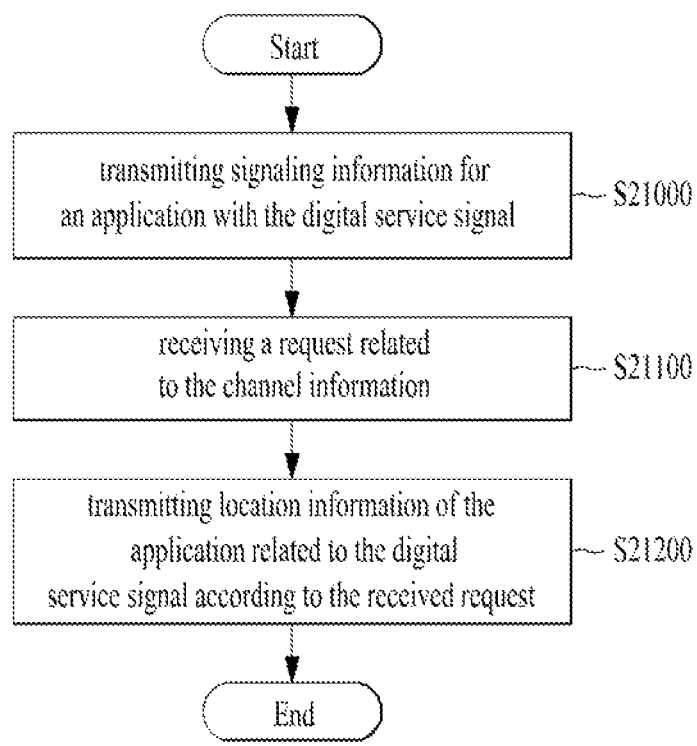

METHOD AND APPARATUS FOR PROCESSING DIGITAL SERVICE SIGNAL

This application claims the benefit of U.S. Provisional Application No. 61/730,062, filed on Nov. 27, 2012, which is hereby incorporated by reference as if fully set forth herein.

BACKGROUND OF THE INVENTION

1. Field of the Invention

The present invention relates to a method and apparatus for processing a digital service signal, and more particularly, to a method and apparatus for processing a digital service signal for controlling an application associated with a current broadcast program in a hybrid digital television (TV) system that transmits/receives terrestrial broadcast data via a broadcast network and the Internet.

2. Discussion of the Related Art

A hybrid digital television (TV) system is a TV system that transmits/receives enhancement data via an Internet protocol (IP) network based on metadata associated with a terrestrial broadcast program so as to provide an improved TV viewing experience to a user.

A transmitter of the hybrid digital TV system may transmit broadcast data and signaling information thereof in real time via a broadcast network. A receiver of the hybrid digital TV system may receive broadcast data and signaling information thereof in real time via a broadcast network. In addition, the receiver of the hybrid digital TV system may receive enhancement data associated with broadcast data via an IP network using the received signaling information.

Thus, in order to acquire an application associated with broadcast data, the receiver of the hybrid TV system needs to receive signaling information required to acquire the corresponding application.

SUMMARY OF THE INVENTION

As described above, a hybrid digital television (TV) system may transmit/receive signaling information required to acquire an application via a broadcast network. When the signaling information required to acquire the application is not transmitted/received through the broadcast network, a receiver of a hybrid TV system may acquire the signaling information required to acquire an associated application from a domain name system (DNS) server and receive the application using the acquired signaling information.

The DNS is a term that collectively indicates a system and a server thereof, which convert a domain indicated by characters such that a user can easily memorize the domain on a TCP/IP network that is an Internet communication standard into numbers to be processed by a computer. A domain name is an Internet address, but requires an Internet address indicated by numbers in order to actually search for a specific computer on the Internet.

All host servers managed by websites have unique Internet protocol (IP) addresses, and thus, the domain name is converted into an Internet protocol (IP) address that can be recognized by a host server through the DNS server. Thus, the DNS server stores domain information and IP information of each website in a database. In this case, when the DNS server receives a signal for access to a corresponding website, the DNS server interprets the signal and connects the signal to a host server of a website having the corresponding IP.

Also in a hybrid digital TV system, a DNS server may store and manage signaling information required to acquire an application associated with a broadcast program per channel of a current broadcast program in a database and transmit the signaling information required to acquire the application to a receiver of the hybrid TV system according to a request signal of the receiver of the hybrid TV system.

In this case, problems may arise in that input information received from an input device cannot be effectively processed by an application.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method and apparatus for processing a digital service signal includes receiving signaling information for an application from the digital service signal, wherein the signaling information includes a service signaling table having channel information, generating a request using the channel information, sending the generated request, receiving location information of the application related to the digital service signal according to the sent request, downloading the application using the received location information, wherein the application is associated with an API (Application Programming Interface) to set the mode information of the application, wherein the mode information includes a mode number indicating a status of the application and specific key set to control the application, wherein the specific key set correspond to the mode number, executing the API to set the mode information and registering the specific key set according to the mode number.

The digital service signal processing method according to an embodiment of the present invention further includes, receiving signaling information for an application from the digital service signal, wherein the signaling information includes a service signaling table having channel information, generating a request using the channel information, sending the generated request, receiving location information of the application related to the digital service signal according to the sent request, downloading the application using the received location information, wherein the application is associated with an API (Application Programming Interface) to set an active area information for indicating an active area of the application, wherein the active area of the application is set to receive pointer information, wherein the active area information includes coordinate information of the active area, width information of the active area and height information of the active area, executing the API and registering the active area by the executed API.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3 is a diagram illustrating instances of an application database in a domain name system (DNS) server according to an embodiment of the present invention;

FIG. 21 is a flowchart of a digital service signal processing method according to further another embodiment of the present invention.

DETAILED DESCRIPTION OF THE INVENTION

Reference will now be made in detail to the preferred embodiments of the present invention, examples of which are illustrated in the accompanying drawings. In this case, the configuration and operation of the present invention will be understood by the embodiments of the present invention described with reference to the accompanying drawings, and the main configuration and operation of the present invention are not limited by the embodiments of the present invention.

Most of the terms used herein are general terms that widely used in the technical art to which the present invention pertains. However, some of the terms used herein may be created reflecting intentions of technicians in the art, precedents, or new technologies. Also, some of the terms used herein may be arbitrarily chosen by the present applicant. In this case, these terms are defined in detail below. Accordingly, the specific terms used herein should be understood based on the unique meanings thereof and the whole context of the present invention.

Figure 1:
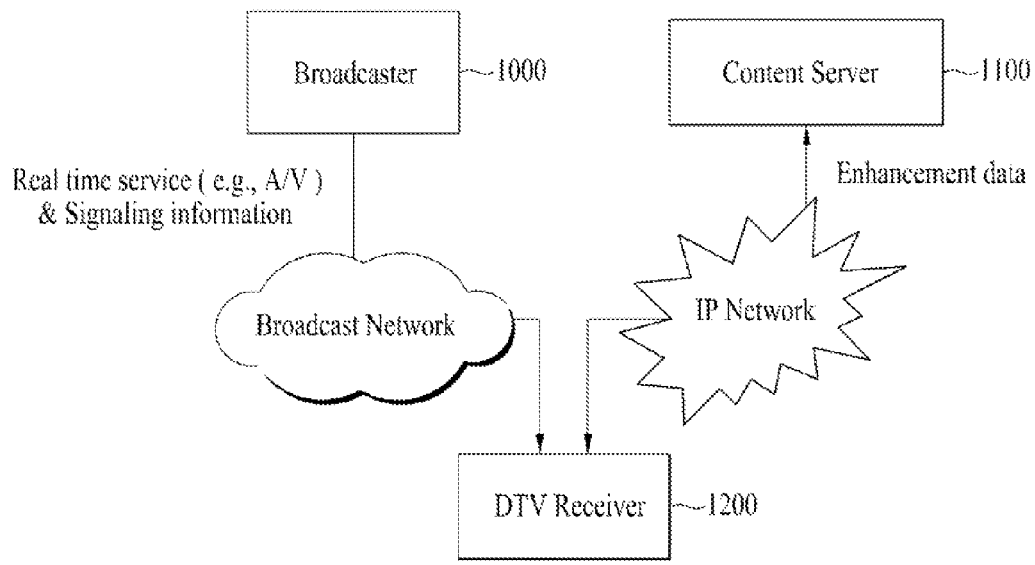
FIG. 1 is a diagram illustrating a hybrid television (TV) system according to an embodiment of the present invention.

FIG. 1 is a diagram illustrating a hybrid television (TV) system according to an embodiment of the present invention.

The hybrid TV system illustrated in FIG. 1 transmits/receives broadcast data and enhancement data via a terrestrial broadcast network and the Internet. As illustrated in FIG. 1, the hybrid TV system may include a broadcaster 1000, a content server 1100, and a DTV receiver 1200. The content server 1100 according to the present embodiment may also be called an application server according to designer's intention. Hereinafter, the hybrid TV system will be described in terms of an operation of each block.

The broadcaster 1000 refers to a broadcast station for transmitting a broadcast program and may transmit A/V data and signaling information of a real-time broadcast service to the DTV receiver 1200 via a broadcast network. The signaling information may include a service signaling table including channel information associated with the A/V data of the real-time broadcast service, signaling information for acquiring an application, etc. The service signaling table according to the present embodiment may include a virtual channel table (VCT), an event information table (EIT), etc. In addition, according to the present invention, the signaling information for acquiring an application is referred to as application signaling information and may be changed according to designer's intention.

The DTV receiver 1200 may request the content server 1100 to transmit an application via the Internet using the application signaling information received via the broadcast network.

In addition, the content server 1100 may transmit enhancement data of a current broadcast service such as an application to the DTV receiver 1200 via the Internet.

Figure 2:
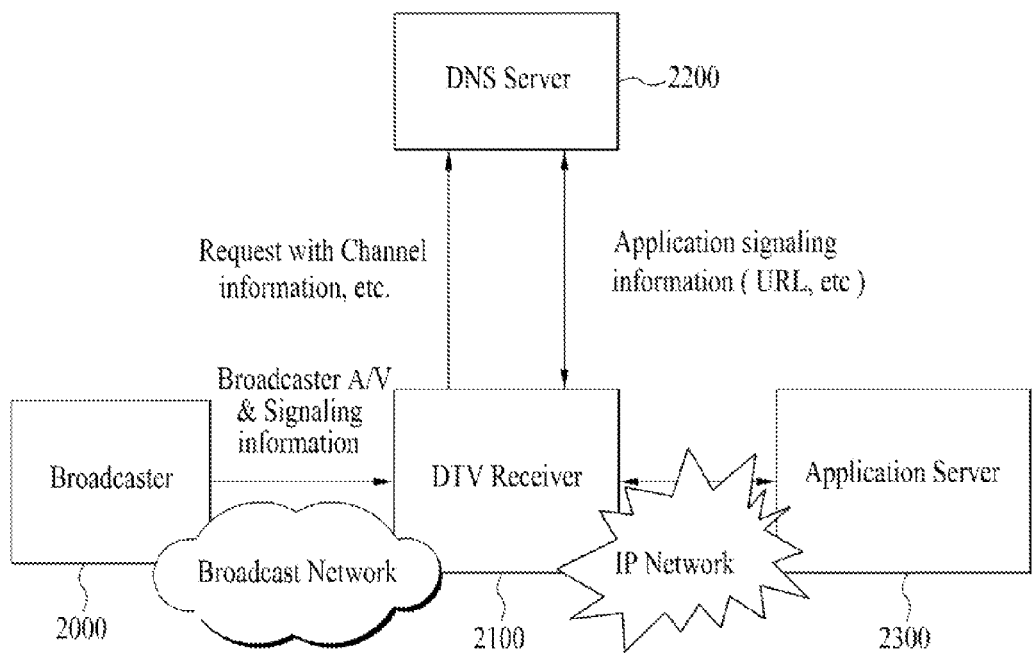
FIG. 2 is a diagram illustrating a hybrid TV system according to another embodiment of the present invention.

FIG. 2 is a diagram illustrating a hybrid TV system according to another embodiment of the present invention.

Although the hybrid TV system illustrated in FIG. 2 is the same as the hybrid TV system described with reference to FIG. 1, FIG. 2 illustrates a case in which the signaling information for acquiring an application is not transmitted/received via a broadcast network.

The hybrid TV system illustrated in FIG. 2 is the same as the hybrid TV system described with reference to FIG. 1, except that the hybrid TV system illustrated in FIG. 2 includes a DNS server 2200. Hereinafter, the hybrid TV system will be described in terms of an operation of each block.

A broadcaster 2000 may transmit A/V data and signaling information of a real-time broadcast service to a DTV receiver 2100 via a broadcast network. In this case, the signaling information may include a service signaling table including channel information associated with the A/V data of the real-time broadcast service, but does not include application signaling information.

Thus, the DTV receiver 2100 may not receive the application signaling information via the broadcast network. In this case, the DTV receiver 2100 may generate a request sentence or a request signal using the signaling information, for example, channel information received via the broadcast network and may transmit a request signal to the DNS server 2200 to request the application signaling information. The application signaling information may include application URL information.

As described above, the DNS server 2200 may store and manage application signaling information associated with a broadcast program per channel of a current broadcast program, in a database. In addition, the DNS server 2200 may transmit the application signaling information to the DTV receiver 2100 according to the request signal of the DTV receiver 2100. The application signaling information stored and managed by the database of the DNS server 2200 will be described below in detail.

Then, the DTV receiver 2100 may request a content server 2300 (or application server 2300) to transmit an application via the Internet using the application signaling information received from the DNS server 2200. In addition, the content server 2300 may transmit enhancement data of a current broadcast service such as application to the DTV receiver 2100 via the Internet.

However, the hybrid TV system described with reference to FIGS. 1 to 2 may receive the application signaling information via the broadcast network or the Internet and acquire an application using the application signaling information, but may not control a life cycle of the corresponding application.

For example, a user who watches and listens to a specific program on one channel terminates an application associated with the specific program using a remote controller, and so on, which will now be described.

The application associated with the specific program is provided in the form of hypertext markup language (HTML) executed on a web browser, and thus, the web browser may also be terminated when the user terminates the application. However, when a broadcast program is changed in the same channel, if a DTV receiver does not acquire application information associated with the changed broadcast program, an application associated with the changed broadcast program cannot be provided to the user.

Thus, the present invention proposes a method and apparatus for controlling a lifecycle of an application associated with the changed broadcast program when the hybrid TV system changes the broadcast program.

In detail, the present invention proposes operations for executing an application according to a case in which a DTV receiver receives change information of a broadcast program from a DNS server and a case in which the DTV receiver receives the change information from a broadcaster in order to control a lifecycle of an application associated with the broadcast program.

Hereinafter, the application execution operation will be described in terms of the case in which the DTV receiver receives the change information of the broadcast program from the DNS server.

FIG. 3 is a diagram illustrating instances of an application database in a DNS server according to an embodiment of the present invention.

As described above, the DNS server and DTV receiver of the hybrid TV system according to the present embodiment may control a lifecycle of a corresponding application according to change information of a broadcast program. In detail, the DNS server according to the present embodiment may manage application signaling information associated with a broadcast program and a current channel, and may transmit associated information to the DTV receiver when the broadcast program is changed. In addition, the DTV receiver according to the present embodiment may acquire the change information of channel or broadcast program from the DNS server, receive associated application signaling information, and acquire and execute an application associated with the changed broadcast program.

FIG. 3 illustrates application signaling information contained in the application database of the DNS server for execution of the aforementioned features.

The DNS server according to the present embodiment may include an application database that maintains and manages the application signaling information associated with a broadcast program per broadcast channel, based on broadcast program time, as illustrated in FIG. 3.

The application database of the DNS server illustrated in FIG. 3 may contain application signaling including a channel number of a broadcast program, information of start time and end time of the corresponding broadcast program, title information of the broadcast program, associated application URL information, etc. The application signaling information may be changed in various ways according to designer's intention.

Thus, the DTV receiver according to the present embodiment may periodically request the application signaling information based on broadcast channel information, current time information, etc. The DNS server according to the present embodiment may extract the application signaling information including the broadcast program information and application URL information from the application database of FIG. 3 and transmit the application signaling information to the DTV receiver according to the request of the DTV receiver. In addition, the DNS server according to the present embodiment may transmit changed application signaling information to the DTV receiver over time when the broadcast program is changed or the application signaling information is changed. The changed application signaling information may include the changed broadcast program information. Thus, the DTV receiver according to the present embodiment may check whether the broadcast program is changed using the application signaling information acquired from the DNS serer, and may control the lifecycle of an application by terminating execution of currently-executed application or executing a new application according to change in the broadcast program.

Figure 4:
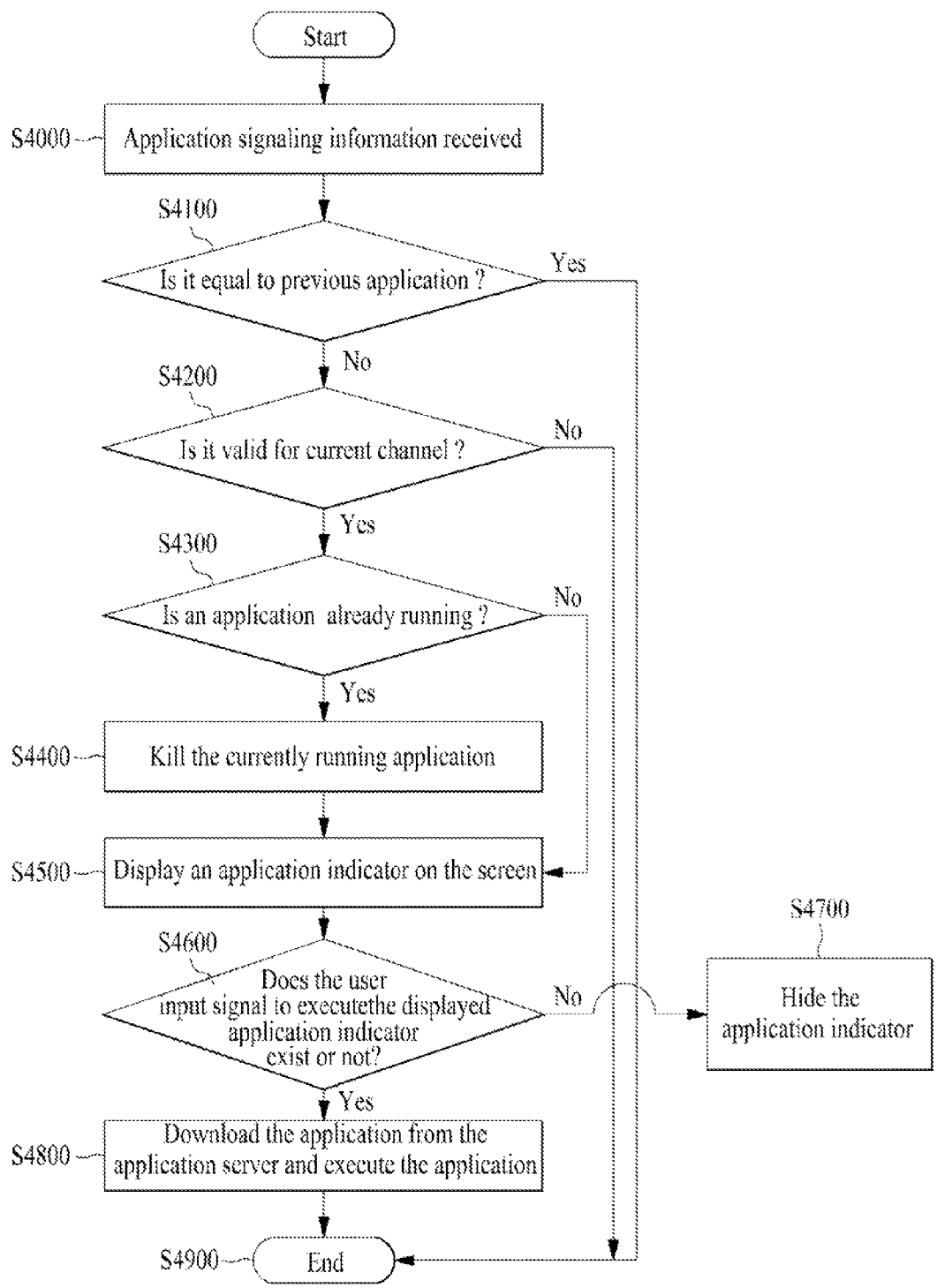
FIG. 4 is a flowchart of an operation of a DTV receiver according to an embodiment of the present invention.

FIG. 4 is a flowchart of an operation of a DTV receiver according to an embodiment of the present invention.

In detail, FIG. 4 is a flowchart illustrating an operation for execution of an application using application signaling information that is received after the DTV receiver according to the present embodiment receives application signaling information from the DNS server.

As described above, the DTV receiver according to the present embodiment may receive application signaling information (S4000). As described with reference to FIG. 3, the DNS server according to the present embodiment may include an application database that maintains and manages application signaling information associated with a broadcast program per broadcast channel, based on time and so on. In addition, the DTV receiver may periodically request application signaling information to the DNS server and receive the application signaling information from the DNS server, based on broadcast channel information, current time information, etc. In addition, the DTV receiver according to the present embodiment may download the corresponding application using the received application signaling information.

Then, the DTV receiver according to the present embodiment may determine whether an application associated with the received application signaling information is equal to a pre-stored or currently executed application using the received application signaling information (S4100). Thus, the DTV receiver according to the present embodiment may check whether the application associated with the received application signaling information is pre-stored.

As the determination result, when the application associated with the received application signaling information is equal to the pre-stored or currently executed application, the DTV receiver according to the present embodiment may terminate an operation for execution of the application using the received application signaling information. In this case, the DTV receiver according to the present embodiment may or may not execute the stored application and maintain an execution state of the application that is being executed.

As the determination result, when the application associated with the received application signaling information is not equal to the pre-stored or currently executed application, the DTV receiver according to the present embodiment may check whether an application associated with the received application signaling information is valid for a current channel, using the received application signaling information (S4200). That is, the DTV receiver may check whether the application associated with the received application signaling information is an application associated with a broadcast program of the current channel.

As the determination result, when the application associated with the received application signaling information is not valid for the current channel, the DTV receiver according to the present embodiment may terminate an operation for execution of the application, using the received application signaling information. In this case, the DTV receiver according to the present embodiment may or may not execute the stored application and maintain an execution state of the application that is being executed.

As the determination result, when the application associated with the received application signaling information is valid for the current channel, the DTV receiver according to the present embodiment may determine whether an application is currently being executed (S4300).

As the determination result, when an application is currently being executed, the DTV receiver according to the present embodiment may stop executing the corresponding application (S4400).

As the determination result, when there is no currently executed application, the DTV receiver according to the present embodiment may display an application indicator for execution of an application on a display unit (S4500).

In addition, the DTV receiver according to the present embodiment may also display the application indicator when execution of the currently executed application is stopped (S4500).

Then, the DTV receiver according to the present embodiment may determine whether a user input signal for execution of the aforementioned application indicator is input by the user (S4600). The application indicator according to the present embodiment may indicate that an associated application is ready to be executed to allow entry using a red button of a remote controller to the user. The application indicator according to the present embodiment may be displayed together with content of a currently displayed broadcast program, and the shape, display position, area, and so on of the application indicator may be changed in various ways according to designer's intention. The user input signal according to the present embodiment may be input to the DTV receiver using the red button of the remote controller by the user.

As the determination result, when the user input signal is not input, the DTV receiver according to the present embodiment may terminate display of the application indicator (S4700).

As the determination result, when the user input signal is input, the DTV receiver according to the present embodiment may download an application from an application server and execute the downloaded application (S4800). The application may be downloaded immediately after the application signaling information is received as described above, or after the user input signal is input, which is performed according to designer's intention.

Then, the DTV receiver may terminate an operation for execution of an application (S4900).

Figure 5:
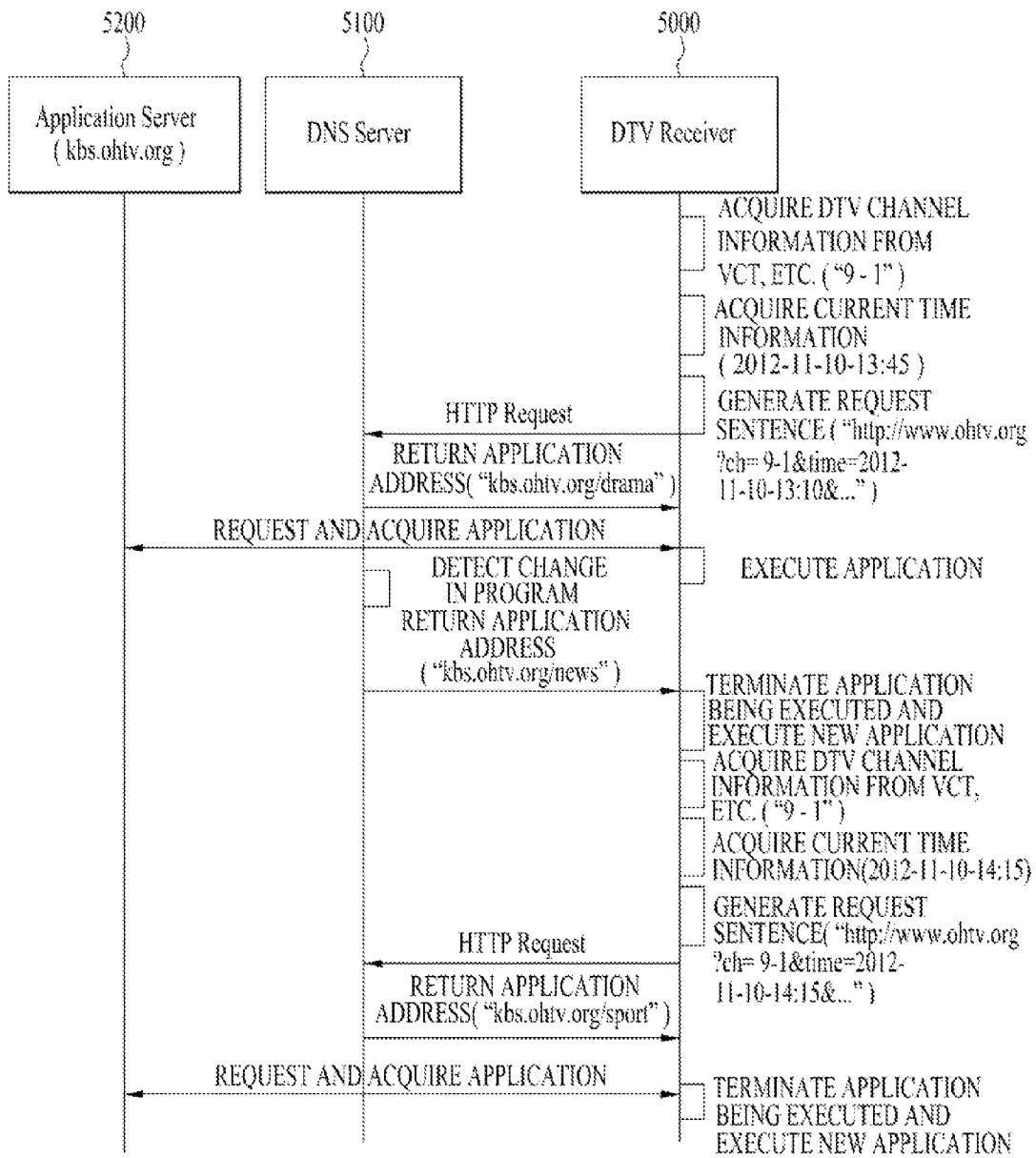
FIG. 5 is a diagram illustrating an operation of a hybrid TV system according to an embodiment of the present invention.

FIG. 5 is a diagram illustrating an operation of a hybrid TV system according to an embodiment of the present invention.

In detail, FIG. 5 illustrates the operation of the hybrid TV system according to the present embodiment in terms of operations of a DTV receiver 5000, a DNS server 5100, and an application server 5200 included in the hybrid TV system described with reference to FIGS. 1 and 2.

Hereinafter, the operation of the hybrid TV system will be described in terms of each component block.

As illustrated in FIG. 5, the DTV receiver 5000 may acquire channel information, time information of a current broadcast program, and so on from signaling information received from a broadcaster. The signaling information received from the broadcaster may include a service signaling table including a VCT and an EIT. The DTV receiver 5000 may acquire channel information, time information of a current broadcast program, and so on from the service signaling table.

Then, the DTV receiver 5000 may generate an HTTP request sentence using the channel information, the current broadcast program, and so on. The HTTP request sentence may be formed by combining a parent domain name, specific media, major channel number, minor channel number, and so on, such as http://www.ohtv.org?ch=9-1&time=2012-11-10-13:10& . . . , which may be changed according to designer's intention.

Then, the DTV receiver 5000 may transmit a request signal for transmitting the HTTP request to the DNS server 5100. As described above, the DNS server 5100 may transmit application signaling information according to the request signal received from the DTV receiver 5000. As illustrated in FIG. 5, the application signaling information may include application URL information and so on.

Then, the DTV receiver 5000 may request an application to the application server 5200 using the application URL information and so on included in the received application signaling information. Then, the application server 5200 may transmit the corresponding application to the DTV receiver 5000. The DTV receiver 5000 may execute the received application.

The DNS server 5100 may manage and maintain the application signaling information as described with reference to FIG. 3. In addition, the DNS server 5100 may transmit changed application signaling information to the DTV receiver over time when the broadcast program is changed or the application signaling information is changed. The changed application signaling information may include changed broadcast program information or application URL information according thereto.

Thus, the DTV receiver 5000 may terminate execution of an application being executed using the application signaling information received from the DNS server 5100 and execute a new application.

As illustrated in FIG. 5, when the application being executed is simultaneously terminated with a program, the DTV receiver 5000 may re-acquire channel information, current time information, and so on from the signaling information received from the broadcaster, generate a request sentence using the acquired channel information, the current time information, and so on, transmit the request sentence to the DNS server 5100, receive application signaling information, request an application to the application server 5200 using the received signaling information, receive the application from the application server 5200, and execute the received application.

That is, as illustrated in FIG. 5, the DTV receiver 5000 may repeatedly perform the aforementioned operations according to whether execution of an application is terminated or application signaling information is changed.

Figure 6:
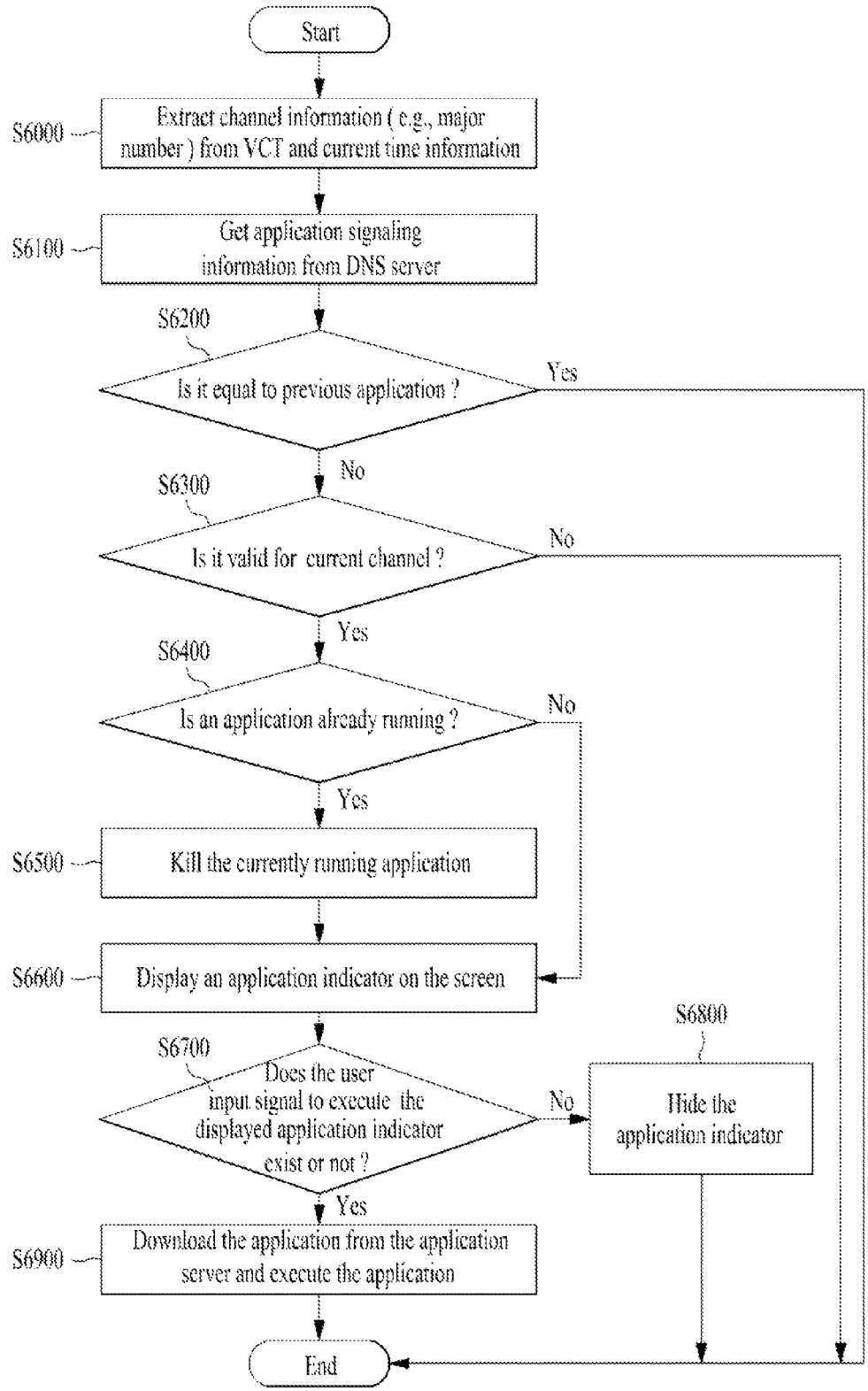
FIG. 6 is a flowchart of an operation of a DTV receiver according to another embodiment of the present invention.

FIG. 6 is a flowchart of an operation of a DTV receiver according to another embodiment of the present invention.

As described above the DTV receiver according to the present embodiment may periodically request a current channel and application signaling information associated with a broadcast program to a DNS server. FIG. 6 illustrates the operation of the DTV receiver according to the present embodiment, which is repeated every period. The operation of the DTV receiver of FIG. 6 is similar to the operation of the DTV receiver described with reference to FIG. 4, and thus, operations that are identical in FIGS. 4 and 6 will be described briefly.

As described with reference to FIG. 5, the DTV receiver may acquire channel information, current time information, and so on from signaling information received from a broadcaster (S6000). The signaling information received from the broadcaster may include a service signaling table such as a VCT.

Then, the DTV receiver according to the present embodiment may receive application signaling information from the DNS server (S6100). As described above, the DTV receiver may generate a request sentence using the signaling information received from the broadcaster and transmit a request signal to the DNS server. The DNS server may transmit application signaling information to the DTV receiver according to the received request signal.

Then, the DTV receiver according to the present embodiment may determine whether application associated with the received application signaling information is equal to pre-stored or currently executed application using the received application signaling information (S6200). Thus, the DTV receiver according to the present embodiment may check whether the application associated with the received application signaling information is pre-stored.

As the determination result, when the application associated with the received application signaling information is equal to the pre-stored or currently executed application, the DTV receiver according to the present embodiment may terminate an operation for execution of the application using the received application signaling information. In this case, the DTV receiver according to the present embodiment may or may not execute the stored application and maintain an execution state of the application that is being executed.

As the determination result, when the application associated with the received application signaling information is not equal to the pre-stored or currently executed application, the DTV receiver according to the present embodiment may check whether application associated with the received application signaling information is valid for a current channel, using the received application signaling information (S6300). That is, the DTV receiver may check whether the application associated with the received application signaling information is an application associated with a broadcast program of the current channel.

As the determination result, when the application associated with the received application signaling information is not valid for the current channel, the DTV receiver according to the present embodiment may terminate an operation for execution of an application, using the received application signaling information. In this case, the DTV receiver according to the present embodiment may or may not execute the stored application and maintain an execution state of the application that is being executed.

As the determination result, when the application associated with the received application signaling information is valid for the current channel, the DTV receiver according to the present embodiment may determine whether an application is executed application (S6400).

As the determination result, when an application is currently being executed, the DTV receiver according to the present embodiment may stop executing the corresponding application (S6500).

As the determination result, when there is no currently executed application, the DTV receiver according to the present embodiment may display an application indicator for execution of an application on a display unit (S6600).

In addition, the DTV receiver according to the present embodiment may also display the application indicator when execution of the currently executed application is stopped (S6600).

Then, the DTV receiver according to the present embodiment may determine whether a user input signal for execution of the aforementioned application indicator is input by the user (S6700).

As the determination result, when the user input signal is not input, the DTV receiver according to the present embodiment may terminate display of the application indicator (S6800).

As the determination result, when the user input signal is input, the DTV receiver according to the present embodiment may download an application from an application server and execute the downloaded application (S6900). The application may be downloaded immediately after the application signaling information is received as described above, or after the user input signal is input, which is performed according to designer's intention.

Then, the DTV receiver may terminate an operation for execution of an application.

Hereinafter, the operation of the DTV receiver will be described in terms of an operation of acquiring change information of a broadcast program from PSIP information received from a broadcaster to control an application.

Figure 7:
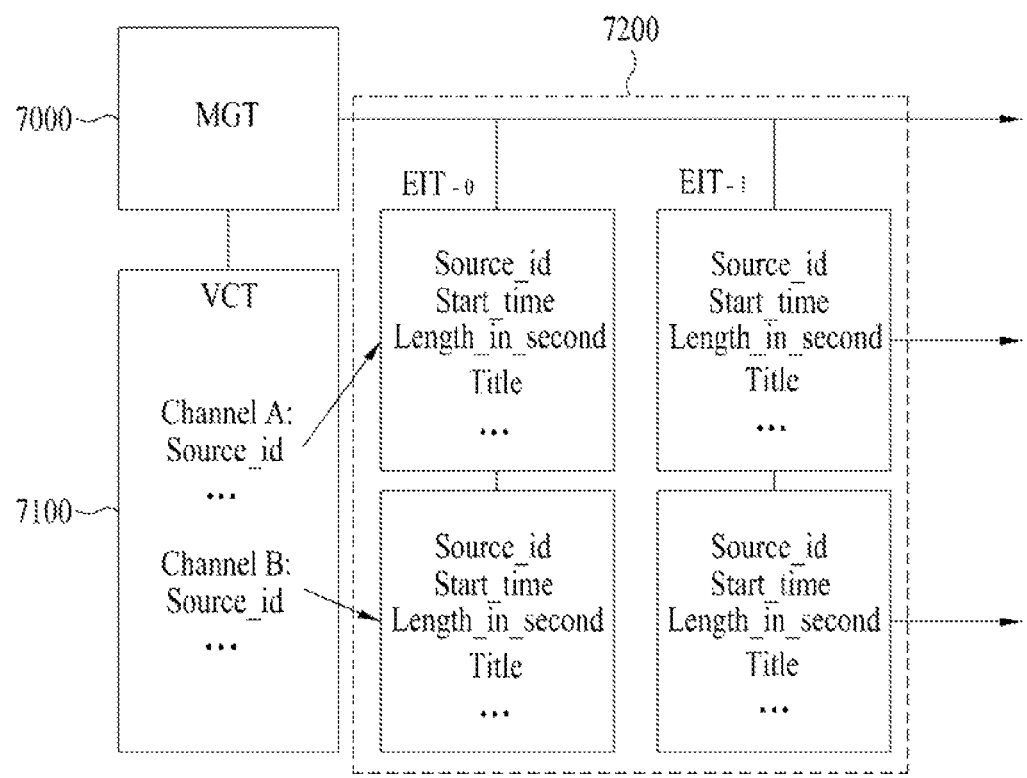
FIG. 7 is a diagram illustrating a relationship between PSIP tables according to an embodiment of the present invention.

FIG. 7 is a diagram illustrating a relationship between PSIP tables according to an embodiment of the present invention.

The DTV receiver according to the present embodiment may extract program information about a broadcast program of a current channel using information of the PSIP table and control a lifecycle of an application associated with the corresponding broadcast program using the extracted program information.

FIG. 7 illustrates the relationship between PSIP tables transmitted from a broadcaster according to an embodiment of the present invention.

As illustrated in FIG. 7, a master guide table (MGT) 7000 includes information about a PSIP stable. Thus, the DTV receiver according to the present embodiment may receive an MGT and acquire PSIP table information in the MGT. Then, the DTV receiver may acquire a virtual channel table (VCT) 7100 including information about a channel, transmitted through a transport stream, and an event information table (EIT) 7200 including detailed information of an event over time of a specific channel.

The DTV receiver may acquire and infer event information of currently and later broadcasted program of a currently watched broadcasted channel using the acquired table information. In detail, as illustrated in FIG. 7, the DTV receiver may acquire a channel number and source_id information indicating a channel provider corresponding to each channel from the VCT 7100. Then, the DTV receiver may acquire corresponding EIT using the source_id information. In addition, the DTV receiver may generate an electronic program guide (EPG) using the acquired information, the program information, and so on and provide the EPG to a user.

As described above, when the DTV receiver enters a specific channel, the DTV receiver may acquire information about a current channel from the VCT and so on and request application signaling information about the corresponding channel to the DNS server using the acquired information. In addition, the DTV receiver may extract information about start and end time of an event of a specific channel, that is, a specific broadcast program using information included in the EIT, and thus, may determine whether a broadcast program is changed over time in the corresponding channel. For example, when a user continuously watches the same channel, the DTV receiver may terminate execution of an application associated with a specific broadcast program at a point of time when the specific broadcast program is terminated.

In addition, when a user randomly terminates execution of an application being executed, using a remote controller and so on, the DTV receiver according to the present embodiment may not execute the corresponding application even if the DTV receiver acquires signaling information about the application, execution of which is terminated by the user, while a broadcast program associated with the terminated application is executed. However, when the corresponding program is terminated and a new broadcast program is started, the DTV receiver according to the present embodiment may request application signaling information associated with the new broadcast program to a DNS server, receive application signaling information associated with the new broadcast program, and execute the corresponding application.

Figure 8:
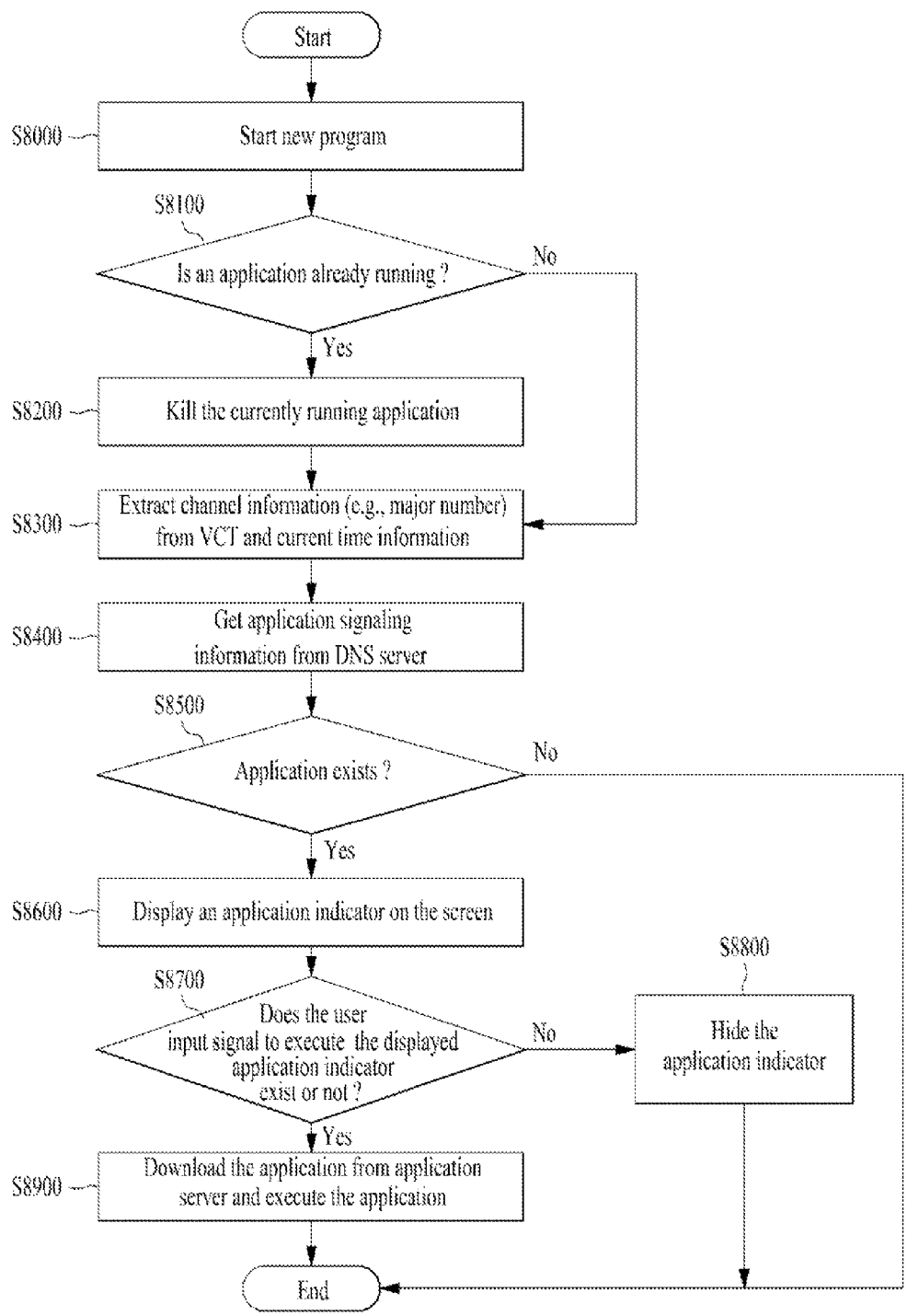
FIG. 8 is a flowchart illustrating an operation of a DTV receiver according to another embodiment of the present invention.

FIG. 8 is a flowchart illustrating an operation of a DTV receiver according to another embodiment of the present invention.

In detail, FIG. 8 is a flowchart illustrating the operation of the DTV receiver according to the present embodiment, for acquiring application signaling information associated with a new broadcast program and executing application when a new broadcast program is started in one channel. The operation of the DTV receiver of FIG. 8 is similar to the operation of the DTV receiver described with reference to FIGS. 4 to 6, and thus, will be described briefly.

The DTV receiver according to the present embodiment may start a new program (S8000).

Then, the DTV receiver according to the present embodiment may determine whether an application is currently being executed (S8100).

As the determination result, when an application is currently being executed, the DTV receiver according to the present embodiment may stop executing the corresponding application (S8200).

Then, the DTV receiver according to the present embodiment may acquire channel information, current time information, and so on from signaling information received from a broadcaster (S8300). The signaling information received from the broadcaster may include a service signaling table such as a VCT.

Then, the DTV receiver according to the present embodiment may receive application signaling information from the DNS server (S8400).

Then, the DTV receiver according to the present embodiment may determine whether there is an application associated with a current broadcast program using the application signaling information (S8500).

As the determination result, when there is no application associated with the current broadcast program, the DTV receiver according to the present embodiment may terminate an operation for execution of an application.

As the determination result, when there is an application associated with the current broadcast program, the DTV receiver according to the present embodiment may display an application indicator for execution of the application on a display unit (S8600).

Then, the DTV receiver according to the present embodiment may determine whether a user input signal for execution of the aforementioned application indicator is input by the user (S8700).

As the determination result, when the user input signal is not input, the DTV receiver according to the present embodiment may terminate display of the application indicator (S8800).

As the determination result, when the user input signal is input, the DTV receiver according to the present embodiment may download an application from an application server and execute the downloaded application (S8900).

Then, the DTV receiver may terminate an operation for execution of an application.

Figure 9:
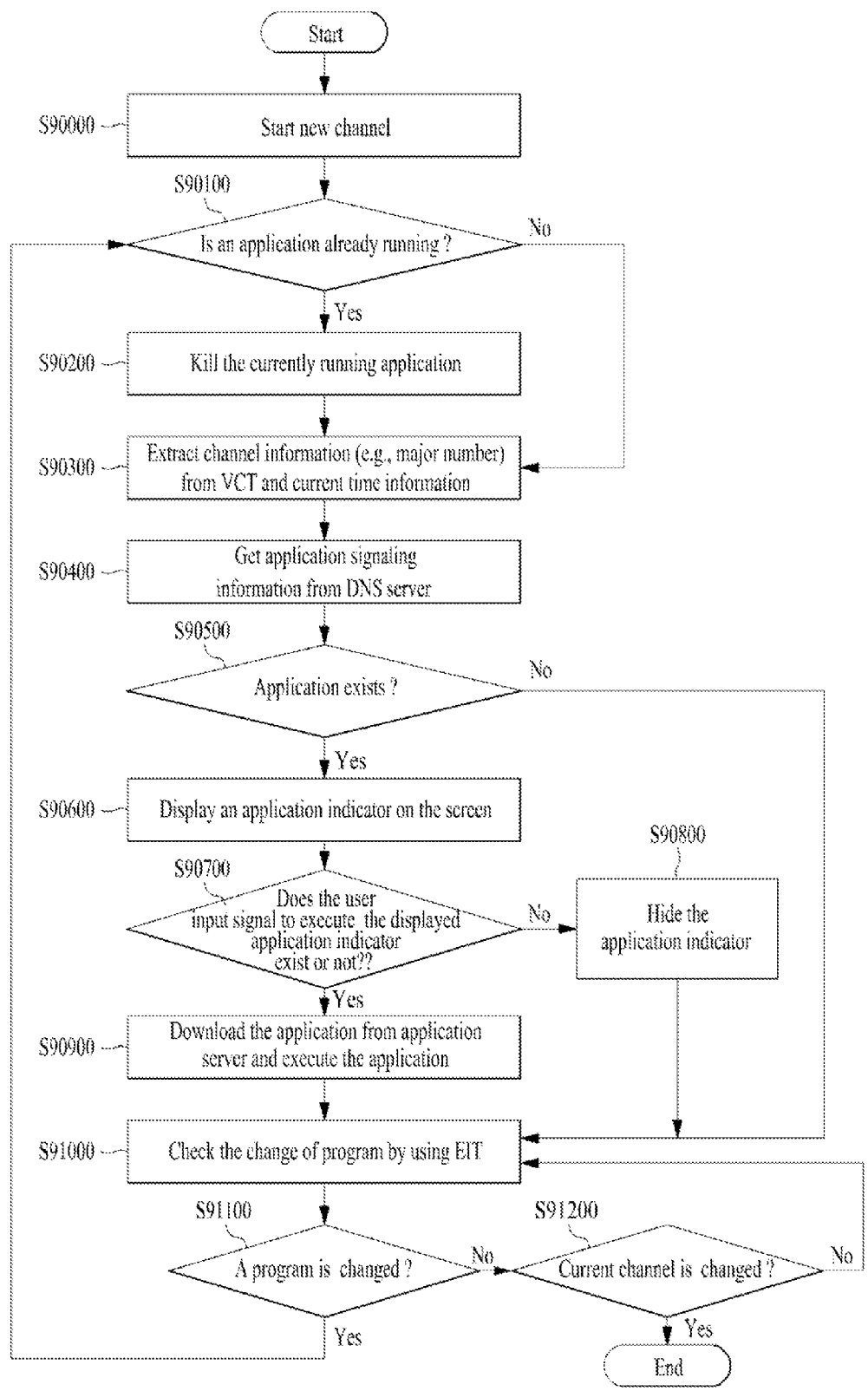
FIG. 9 is a flowchart of an operation of a DTV receiver according to another embodiment of the present invention.

FIG. 9 is a flowchart of an operation of a DTV receiver according to another embodiment of the present invention.

In detail, FIG. 9 is a flowchart illustrating the operation of the DTV receiver according to the present embodiment, for acquiring application signaling information associated with a new channel when the DTV receiver enters a new channel. The operation of the DTV receiver of FIG. 9 is similar to the operation of the DTV receiver described with reference to FIGS. 4 to 6 and 8, and thus, will be described briefly (S90000).

Then, the DTV receiver according to the present embodiment may determine whether an application is currently being executed (S90100).

As the determination result, when an application is currently being executed, the DTV receiver according to the present embodiment may stop executing the corresponding application (S90200).

Then, the DTV receiver according to the present embodiment may acquire channel information, current time information, and so on from signaling information received from a broadcaster (S90300).

Then, the DTV receiver according to the present embodiment may receive application signaling information from the DNS server (S90400).

Then, the DTV receiver according to the present embodiment may determine whether there is an application associated with a current broadcast program using the application signaling information (S90500).

As the determination result, when there is no currently executed application, the DTV receiver according to the present embodiment may change whether a program of a current channel is changed using EIT received from the broadcaster (S91000).

As the determination result, when there is an application associated with a current program, the DTV receiver according to the present embodiment may display an application indicator for execution of the application on a display unit (S90600).

Then, the DTV receiver according to the present embodiment may determine whether a user input signal for execution of the aforementioned application indicator is input by the user (S90700).

As the determination result, when the user input signal is not input, the DTV receiver according to the present embodiment may terminate display of the application indicator (S90800). Then, the DTV receiver according to the present embodiment may check whether the program of the current channel is changed using the EIT received from the broadcaster (S91000).

As the determination result, when the user input signal is input, the DTV receiver according to the present embodiment may download an application from an application server and execute the downloaded application (S90900).

Then, the DTV receiver according to the present embodiment may check whether the broadcast program of the current channel is changed using the EIT received from the broadcaster (S91000).

As the check result, when the broadcast program is changed, the DTV receiver according to the present embodiment may re-determine whether an application is currently being executed (S90100). Then, the DTV receiver according to the present embodiment may re-perform the operations from S90200.

As the determination result, when the broadcast program is not changed, the DTV receiver according to the present embodiment may determine whether the current channel is changed (S91200).

As the determination result, when the channel is changed, the DTV receiver according to the present embodiment may check whether the program of the current channel is changed using the EIT received from the broadcaster (S91000). Then, the DTV receiver according to the present embodiment may re-perform the operations from S91100.

As the determination result, when the channel is not changed, the DTV receiver according to the present embodiment may terminate an operation for execution of an application.

Figure 10:
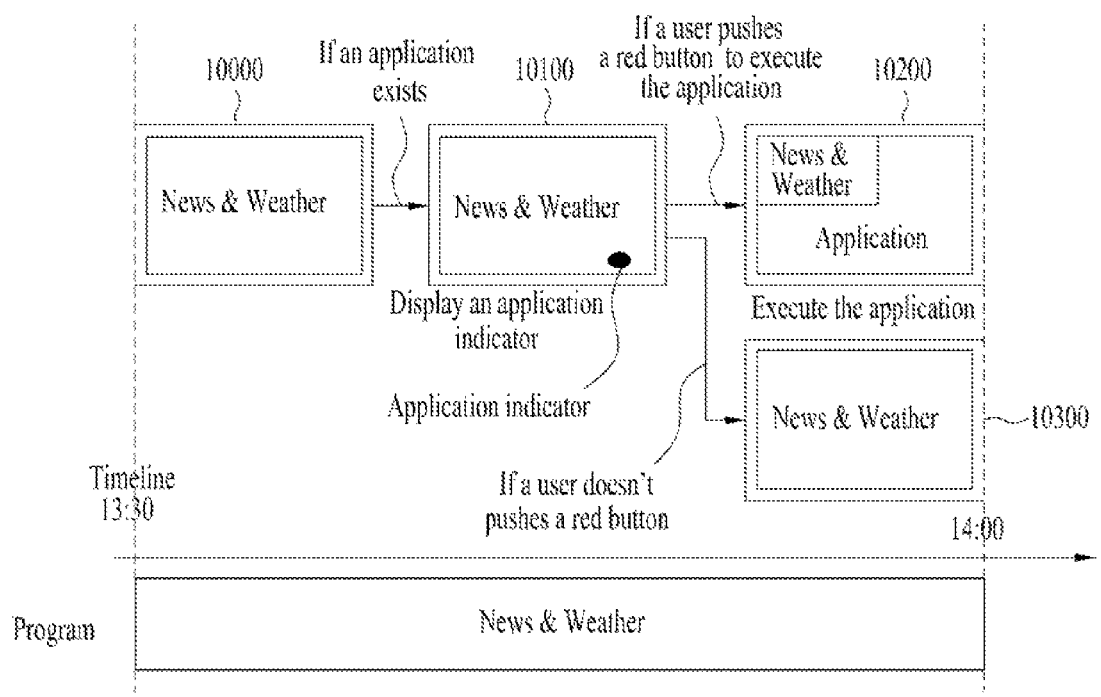
FIG. 10 is a diagram illustrating an operation of a DTV receiver according to an embodiment of the present invention.

FIG. 10 is a diagram illustrating an operation of a DTV receiver according to an embodiment of the present invention.

FIG. 10 illustrates the operation of the DTV receiver according to a user input when there is an application associated with the current program. In detail, FIG. 10 illustrates the operation of the DTV receiver according to the present embodiment during broadcast time of a news & weather broadcast program.

As described with reference to FIGS. 4 to 6 and 8 to 9, the DTV receiver according to the present embodiment may display the news & weather broadcast program during broadcast time (timeline) (10000). Then, the DTV receiver according to the present embodiment may receive application signaling information from a broadcaster or a DNS server and determine whether there is an application associated with the currently displayed news & weather broadcast program using the application signaling information.

As described above, when the application signaling information is received from the DNS server, the DTV receiver according to the present embodiment may generate a request sentence using current time information, channel information, and so on acquired from the signaling information received from the broadcaster, transmit a request signal to a DNS server, and receive application signaling information from the DNS server. A detailed description thereof is the same as in FIGS. 4 to 6 and 8 to 9 and thus is not given here.

In addition, the DTV receiver according to the present embodiment may display an application indicator for execution of an application on a display unit (10100). As described above, the application indicator according to the present embodiment may indicate that associated application is ready to be executed to allow entry using a red button of a remote controller to the user. In addition, as illustrated in FIG. 10, the application indicator according to the present embodiment may be displayed together with content of a currently displayed broadcast program, and the shape, display position, and so on of the application indicator may be changed in various ways according to designer's intention. The user input signal according to the present embodiment may be transmitted to the DTV receiver using the red button of the remote controller of the user. Thus, the DTV receiver according to the present embodiment may determine whether the user input signal for execution of the aforementioned application indicator is input by the user.

Upon determining that the user input signal is input, the DTV receiver according to the present embodiment may download an application from an application server and execute the downloaded application (10200). In this case, as illustrated in FIG. 10, the DTV receiver according to the present embodiment may terminate display of the application indicator and simultaneously display application and content of the current news & weather broadcast program on a display unit of the DTV receiver.

Upon determining that the user input signal is not input, the DTV receiver according to the present embodiment terminates display of the application indicator and does not execute the application until the current news & weather program is terminated (10300).

Figure 11:
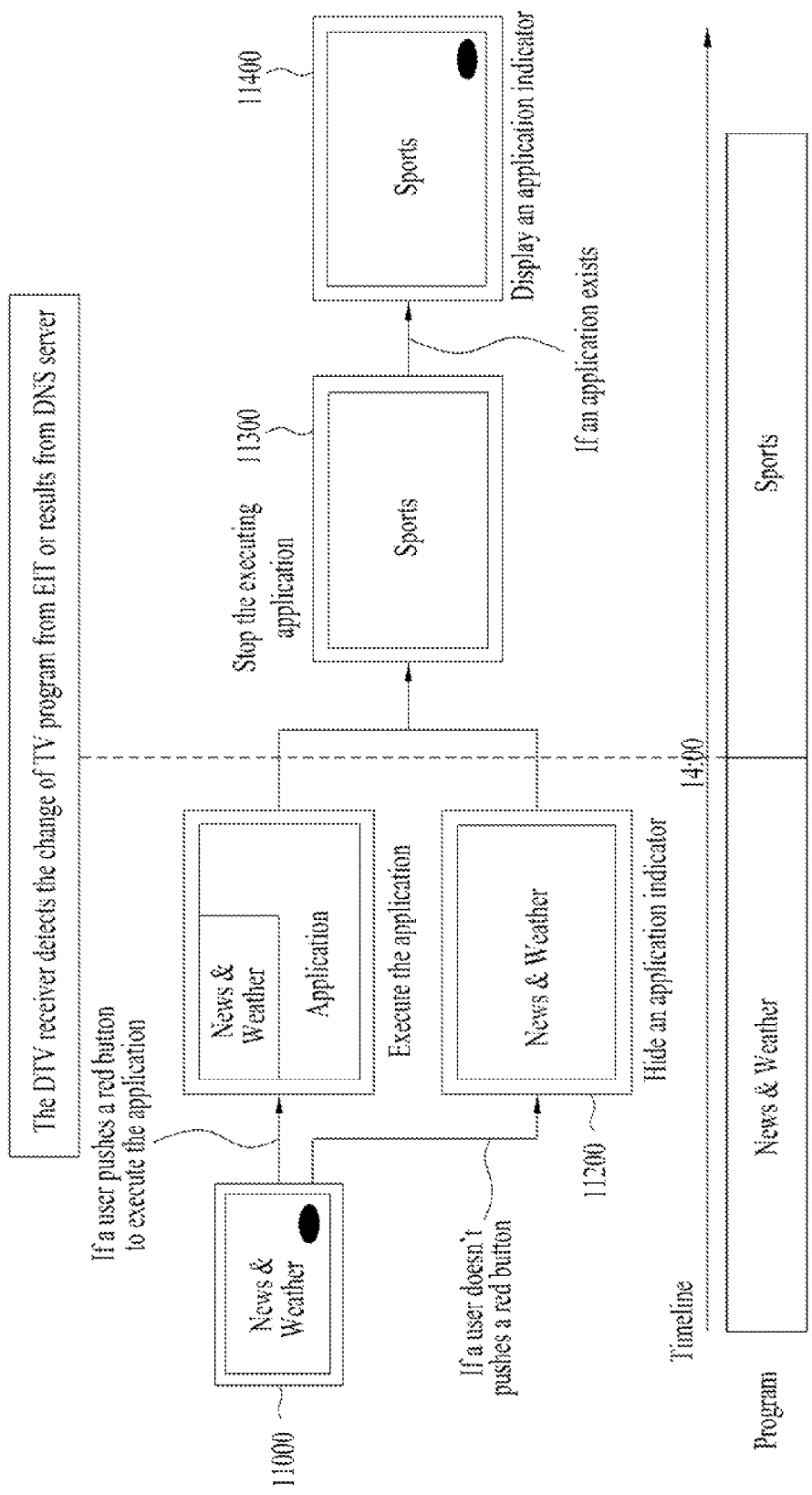
FIG. 11 is a diagram illustrating an operation of a DTV receiver according to another embodiment of the present invention.

FIG. 11 is a diagram illustrating an operation of a DTV receiver according to another embodiment of the present invention.

FIG. 11 illustrates the operation of the DTV receiver for controlling a lifecycle of an application when a currently broadcasted program is changed. In detail, FIG. 11 illustrates the operation of the DTV receiver that terminates execution of an application when the news & weather broadcast program is changed to a sports broadcast program. FIG. 11 assumes that there is an application associated with the current news & weather broadcast program, as described with reference to FIG. 10.

As described with reference to FIGS. 4 to 6 and 8 to 9, the DTV receiver according to the present embodiment may display an application indicator for execution of an application during broadcast time (timeline) of the news & weather broadcasts program (10000).

Then, the DTV receiver according to the present embodiment may determine whether a user input signal for execution the aforementioned application indictor is input by a user, as described with reference to FIG. 10.

Upon determining that the user input signal is input, the DTV receiver according to the present embodiment may download application from an application server and execute the downloaded application (11200). In this case, as illustrated in FIG. 10, the DTV receiver according to the present embodiment may terminate display of the application indicator and may simultaneously display application and content of the current news & weather broadcast program on a display unit of the DTV receiver.

Upon determining that the user input signal is not input, the DTV receiver according to the present embodiment may terminate display of the application indicator and may not execute the application until the current news & weather broadcast program is terminated (11300).

Then, the DTV receiver according to the present embodiment may receive changed application signaling information from the DNS server or detect whether the current program is changed using information included in VIT and EIT received from a broadcaster.

When the changed application signaling information from the DNS server or the information included in the VIT and the EIT indicates that the current news & weather broadcast program is terminated and the sports broadcast program is started, the DTV receiver according to the present embodiment may terminate the displayed news & weather broadcast program and application according to the changed application information from the DNS server or the information included in the VIT and the EIT and may display a new sport broadcast program (11300). A detailed description thereof is the same as in FIGS. 3 to 9.

Then, the DTV receiver according to the present embodiment may receive application signaling information from the broadcaster or the DNS server and determine whether there is an application associated with the currently displayed news & weather program using the application signaling information, as described above. A detailed description thereof is the same as in FIGS. 4 to 6 and 8 to 10, and thus, is not given here.

Then, the DTV receiver according to the present embodiment may display an application indicator for execution of an application on a display unit (11400).

key code may be a code for identifying or describing keys and may be represented in a numeric form, i.e., integers and so on.

Table 1 below shows an embodiment of an API used to configure key information required for the aforementioned application for the DTV receiver. According to an embodiment of the present invention, the API may be referred to as a SetKeyValues API and changed according to designer's intention. In addition, according to an embodiment of the present invention, the API may be represented by SetKeyValues (Integer keys[ ]) and a value of the integer key in the brackets corresponds to the keycode of keys to be input to each application. The description shown in Table 1 below is used to define a function of the SetKeyValues API. The device in the description may refer to a digital signal processing apparatus or a DTV receiver according to the present invention. The keyset in the description may refer to a set of keys to be transmitted to the application. The Argument refers to a parameter of the API. As shown in Table 1 below, the argument of the SetKeyValues API is Keys and refers to an integer set of keys requested by an application.

TABLE 1

| void SetKeyValues (Integer keys[ ]) | | |
|---|---|---|
| Description | | A value of a keyset to be transmitted to an application may be configured in a device. Each key is associated with a keycode in the form of an integer. A numeric value may be configured for keys to be transmitted to the application using the keycode. When an event corresponding to a key occurs, the device may determine whether information about the key is transmitted to the application using a value configured through a corresponding API. |
| Arguments | Keys | An integer set of keys which the application requests to receive. Each key is associated with an integer value. |

As described above, the DTV receiver according to the present embodiment may receive input information through an input device. The input information according to the present embodiment may include a user input signal and so on that are input by pressing a specific key of a remote controller. An application being executed by the DTV receiver may receive the input information to perform an operation according to the input information and return control regarding a key of the remote controller, corresponding to the input information, to the DTV receiver so as to allow the DTV receiver to perform an operation associated with the corresponding key. Throughout this specification, key input or an operation associated therewith may be called a key event. However, problems arise, in that while the application processes an event corresponding to the corresponding key, if execution of the application is stopped, the DTV receiver cannot acquire control about the corresponding key and cannot perform an operation associated with the corresponding key.

Thus, to overcome the aforementioned problem, the present invention proposes a method of transmitting corresponding input information to an application only when input information of an input device, to be processed in a corresponding application, is pre-configured for the DTV receiver per application and the corresponding input information is input to the DTV receiver. In detail, the present invention proposes a method using an application programming interface (API) in order to configure information about a key required for an application of the input information input through the input device such as a remote controller and so on, for the DTV receiver. Information of a plurality of keys may be input through the input device such as a remote controller and so on and mapped to a key code. The plural keys according to the present embodiment may be called a keyset. The FIG. 12 is a diagram illustrating an operation of an application for calling an API according to an embodiment of the present invention.

Figure 12:
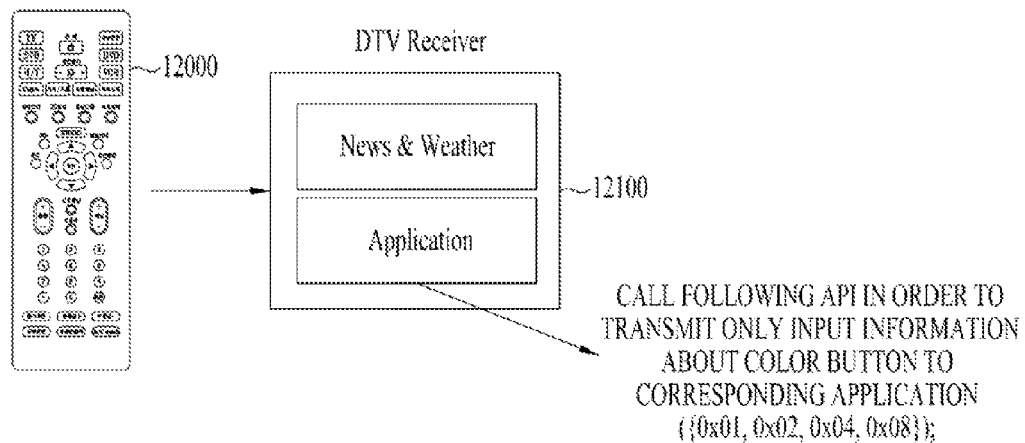
FIG. 12 is a diagram illustrating an operation of an application for calling an application programming interface (API) according to an embodiment of the present invention.

FIG. 12 illustrates an operation for executing the aforementioned API in order to receive only a keycode of a color button to a currently-executed application when keycodes of color and left buttons of a remote controller 12000 are configured as specific integers.

As illustrated in FIG. 12, a user may press the color or left button of the remote controller 12000 to input a key corresponding to each button to a DTV receiver 12100. A keycode of each key may have the following integer value as illustrated in FIG. 12.

const Number VK_RED=0x01;
const Number VK_GREEN=0x02;
const Number VK_YELLOW=0x04;
const Number VK_BLUE=0x08;
const Number VK_LEFT=0x10;

An application according to an embodiment of the present invention may configure a keyset value to be transmitted to the corresponding application for a DTV receiver 12100 using the aforementioned API of Table 1 above. In this case, as illustrated in FIG. 12, a keyset to be transmitted to a current application includes only a color button, and thus, the API of Table 1 above may be represented as a keycode value of the color button, as illustrated in FIG. 12.

Figure 13:
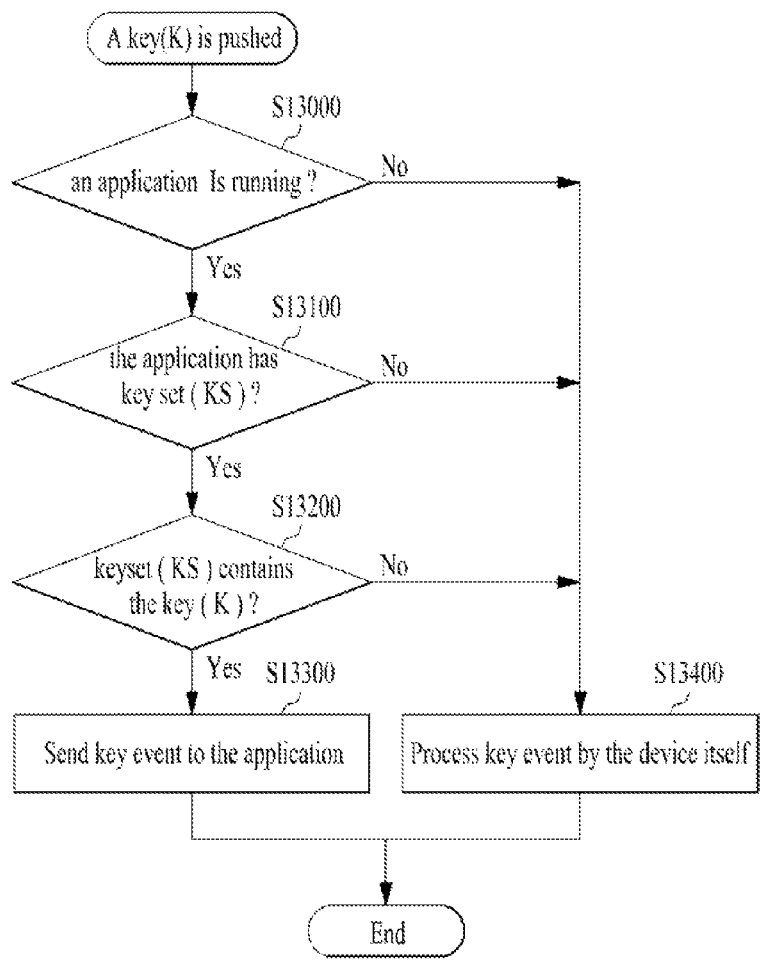
FIG. 13 is a flowchart of a method of processing a digital service signal according to an embodiment of the present invention.

SetKeyValues({0x01, 0x02, 0x04, 0x08});

FIG. 13 is a flowchart of a method of processing a digital service signal according to an embodiment of the present invention.

In detail, the flowchart of FIG. 13 illustrates a process of processing key input based on a keyset to be used in an application by a digital service signal processing apparatus according to an embodiment of the present invention. The digital service signal processing apparatus according to the present embodiment may be interpreted as including only a DTV receiver or the hybrid digital TV system described with reference to FIGS. 1 and 2, which may be changed according to designer's intention.

When the user inputs information corresponding to a specific key of a remote controller, the digital service signal processing apparatus may determine whether a current application is running (S13000).

As the determination result, when the current application is running, the digital service signal processing apparatus may determine whether the application has a keyset, i.e., keys to be transmitted to the application (S13100). As described with reference to FIG. 12, the application according to the present embodiment may configure the keyset to be transmitted to the application using an API, and thus, the digital service signal processing apparatus may check the configured keyset through the API.

As the determination result, when the current application is not running, the digital service signal processing apparatus may process a key event (S13400). Then, the digital service signal processing apparatus may determine whether a currently input key is included in the keyset contained in the application (S13200).

As the determination result, when the keyset contained in the application contains the currently input key, the digital service signal processing apparatus may transmit the key event to the application (S13300).

As the determination result, when the keyset contained in the application does not contain the currently input key, the digital service signal processing apparatus may process the key event (S13400).

Then, the digital service signal processing apparatus according to the present embodiment may terminate a series of operations.

As described above, according to an embodiment of the present invention, an API is used to transmit input information to an application only when the corresponding input information of an input device, to be processed in the corresponding application, is pre-configured for the DTV receiver per application and the corresponding input information is input to the DTV receiver. Hereinafter, an API for applying pointer information to a specific region of a displayed application when an input device is a pointing device will be described with regard to an embodiment of present invention.

When the input device is a pointing device, it is relatively effective to apply the pointing information only to a specific region, but not to an entire region of the displayed application. Thus, an application according to an embodiment of the present invention may call an API of Table 2 below and configure or request a region of the application, in which pointer information is to be input or to be activated, to the DTV receiver. According to the present embodiment, the region of the application, in which the pointer information is to be input or to be activated, may be referred to as an active area, which may be changed according to designer's intention. In addition, according to the present invention, input of the pointer information or an operation associated therewith may be referred to as a pointer event.

Table 2 below shows an embodiment of an API used to configure an active area in a DTV receiver. According to an embodiment of the present invention, the API may be referred to as a SetActiveArea API, which may be changed according to designer's intention. In addition, according to the present embodiment, the API may be represented in SetActiveArea (Integer x, Integer y, Integer width, Integer height). The 'Integer x, Integer y, Integer width, Integer height' in the brackets is a coordinate value indicating the active area of the application and has an integer value. The description shown in Table 2 below is used to define a function of the SetActiveArea API. The device in the description may refer to a digital signal processing apparatus or a DTV receiver according to the present invention. The Argument refers to a parameter of the API. As shown in Table 2 below, the parameter of the SetActiveArea API may include x, y, width, and height. x and y refer to a coordinate of a left upper corner of the active area. In addition, the width may refer to a width of the active area and the height may refer to a height of the active area.

TABLE 2

| | | |
|---|---|---|
| void SetActiveArea (Integer x, Integer y, Integer width, Integer height) | | |
| Description | A region of the application, in which pointer information is to be activated, is configured in order to request the pointer information. | |
| Arguments | X | x coordinate of top left corner |
| | Y | y coordinate of top left corner |
| | Width | Width of the active area in which a pointer input can be used |
| | Height | Height of the active area in which a pointer input can be used |

Figure 14:
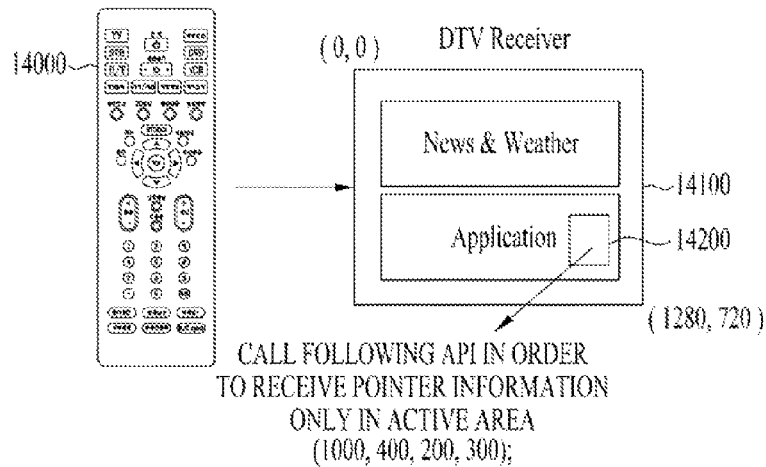
FIG. 14 is a diagram illustrating an operation of an application for calling an API according to another embodiment of the present invention.

FIG. 14 is a diagram illustrating an operation of an application for calling an API according to another embodiment of the present invention.

FIG. 14 illustrates an operation for calling an API shown in Table 2 above in order to use pointer information for an active area 14200 only when an input device 14000 is a pointing device.

When a user inputs pointer information using the input device 14000, an application according to an embodiment of the present invention may configure the active area 14200 in a DTV receiver 14100 using the API of Table 2 above.

As illustrated in FIG. 14, as an indicator of an entire display region of the DTV receiver 14100, a left upper portion may be represented by (0, 0) and a right lower portion may be represented by (1280, 720). In addition, as illustrated in FIG. 14, a coordinate of the left upper portion of the active area 14200 corresponds to (1000, 400), a width corresponds to 200, and a height corresponds to 300. Thus, the API of Table 2 above may be represented as follows.

Figure 15:
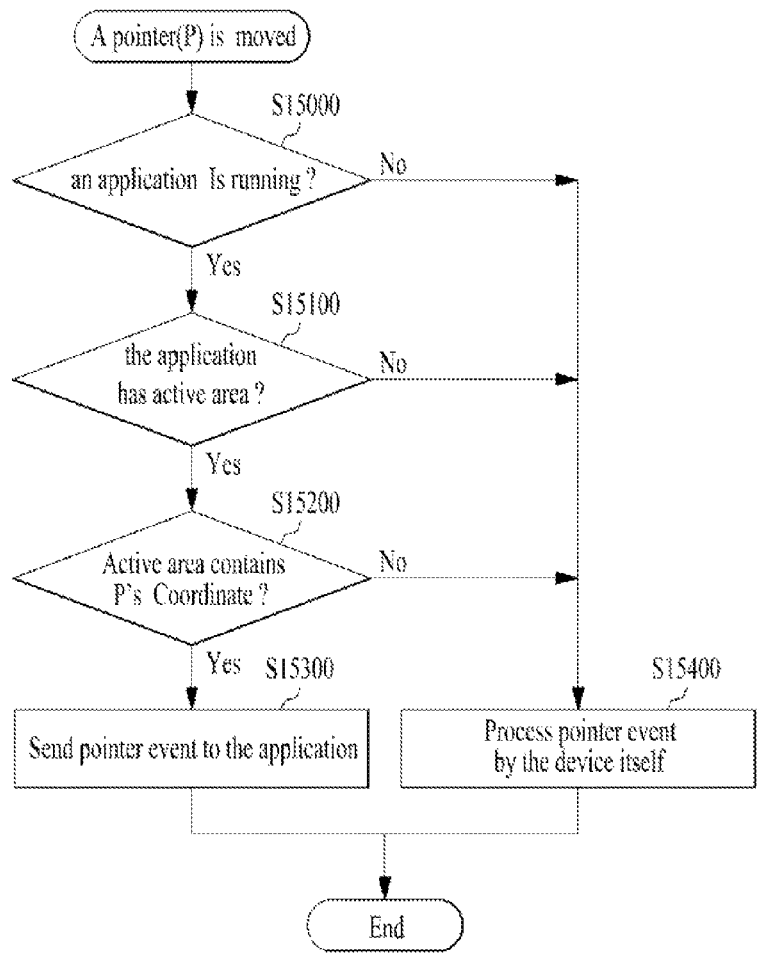
FIG. 15 is a flowchart of a method of processing a digital service signal according to another embodiment of the present invention.

SetActiveArea(1000, 400, 200, 300);

FIG. 15 is a flowchart of a method of processing a digital service signal according to another embodiment of the present invention.

In detail, the flowchart of FIG. 15 illustrates a process of processing pointer input based on an active area by a digital service signal processing apparatus according to an embodiment of the present invention. The digital service signal processing apparatus according to the present embodiment may be interpreted as including only a DTV receiver or the hybrid digital TV system described with reference to FIGS. 1 and 2, which may be changed according to designer's intention.

When the user moves a pointer of an input device, the digital service signal processing apparatus may determine whether a current application is running (S15000).

As the determination result, when the current application is running, the digital service signal processing apparatus may determine whether the application has an active area (S15100). As described with reference to FIG. 14, the application according to the present embodiment may configure the active area using an API, and thus, the digital service signal processing apparatus may check the configured active area through the API.

As the determination result, when the current application is not running, the digital service signal processing apparatus may process a pointer event (S15400). Then, the digital service signal processing apparatus may determine whether a position coordinate of a currently input pointer is within the active area of the application (S15200).

As the determination result, when the position coordinate of the currently input pointer is within the active area, the digital service signal processing apparatus may transmit the pointer event to the application (S15300).

As the determination result, when the position coordinate of the currently input pointer is not within in the active area, the digital service signal processing apparatus may process the pointer event (S15400).

Then, the digital service signal processing apparatus according to the present embodiment may terminate a series of operations.

As described above, according to an embodiment of the present invention, an API is used to transmit input information to an application only when the corresponding input information of an input device, to be processed in a corresponding application, is pre-configured for the DTV receiver per application and the corresponding input information is input to the DTV receiver.

Hereinafter, an API for requesting only specific input information such as a keyset to a device according to distinguished application states will be described. According to an embodiment of the present invention, an application may represent application states by respective modes using an API of Table 3 below, pre-define input information of the application according to each mode, and then request or configure the input information defined per mode to the device as the application mode is changed. Thus, the device may effectively process the input information according to each mode even if the application mode is changed.

Table 3 below shows an embodiment of an API used to configure an application mode and input information defined per mode for a DTV receiver. According to an embodiment of the present invention, the API may be referred to as a SetAppMode API and changed according to designer's intention. In addition, according to an embodiment of the present invention, the API may be represented by SetAppMode(Integer mode, Integer keys[ ]). A value of the 'Integer mode, Integer keys[ ]' in the brackets indicates an application mode and input information per mode and may be an integer value. The description shown in Table 3 below is used to define a function of the SetAppMode API. The device in the description may refer to a digital signal processing apparatus or a DTV receiver according to the present invention. The Argument refers to a parameter of the API. As shown in Table 3 below, the parameter of SetAppMode API may include a mode and a key. The Mode may refer to an application state and may have an integer value corresponding to each state. The key may be defined per mode and may include an integer set. As described above, the key may be mapped to a keycode. According to the present invention, an integer value indicating a mode is referred to as a mode number, and mode numbers and a key set configured per mode number may be collectively referred to as mode information, which may be changed according to designer's intention.

As shown in Table 3 below, the mode may have a value such as 0, 1, 2, etc. and an application state indicated by each value will now be described below.

A mode value of 0 means that the application mode is not specified.

A mode value of 1 means that the application is an icon, which may be referred to as ICON_MODE or a trigger mode and may be changed according to designer's intention. When the mode value is 1, only an implicative indicator of the application, e.g., an application indicator is displayed on a screen. When a mode value is 1, a key value may include a color key (Red, Green, Yellow, and Blue) in a remote controller, which may be changed according to designer's intention.

A mode value of 2 means that an entire application is executed, which may be referred to as APP_MODE. That is, when a mode value is 2, actual content of the application may be displayed on the screen. APP_MODE may be divided into a state in which actual content of the application is displayed on a partial region of the screen, and a state in which actual content of the application is displayed on an entire region of the screen, which may be changed according to designer's intention.

When a mode value is 2, a key value may include a color key, a navigation key (left, right, up, and down), an enter key, a reproduction control key (stop, pause, rewind, play, and fast FWD), etc. of the remote controller. When the actual content of the application is displayed on the entire region of the screen, the key value may further include a number key, and so on, which may be changed according to designer's intention.

A mode value of 3 to 7 may be a user-defined value and, in this case, an additional mode may be configured according to designer's intention. In particular, when a mode value is 3 to 7, additional modes may be extended compared with a case in which a mode is 1 or 2, and a key set to be used in each extended mode may be pre-defined in a device or defined using an API. Thus, a case in which actual content of an application corresponding to a mode value of 2 is displayed on an entire region of the screen may be configured as an additional mode.

TABLE 3

IntegerSetAppMode(Integer mode, Integer keys[ ])
| | | |
|---|---|---|
| Description | An application mode is configured and reported to a device. If the function succeeds, the return value identifies the previous application mode. If the function fails, the return value is zero. | |
| Arguments | Mode | An integer value of mode which indicates the application status.<br>0: Not specified<br>1: ICON_MODE (when an application is in an icon mode)<br>2: APP_MODE (when an application is entirely executed)<br>3-7: USER_DEFINED |
| | Keys | This parameter is optional. If this parameter has the value then indicates an integer set of keys which the application requests to receive according to the mode parameter. |

Figure 16:
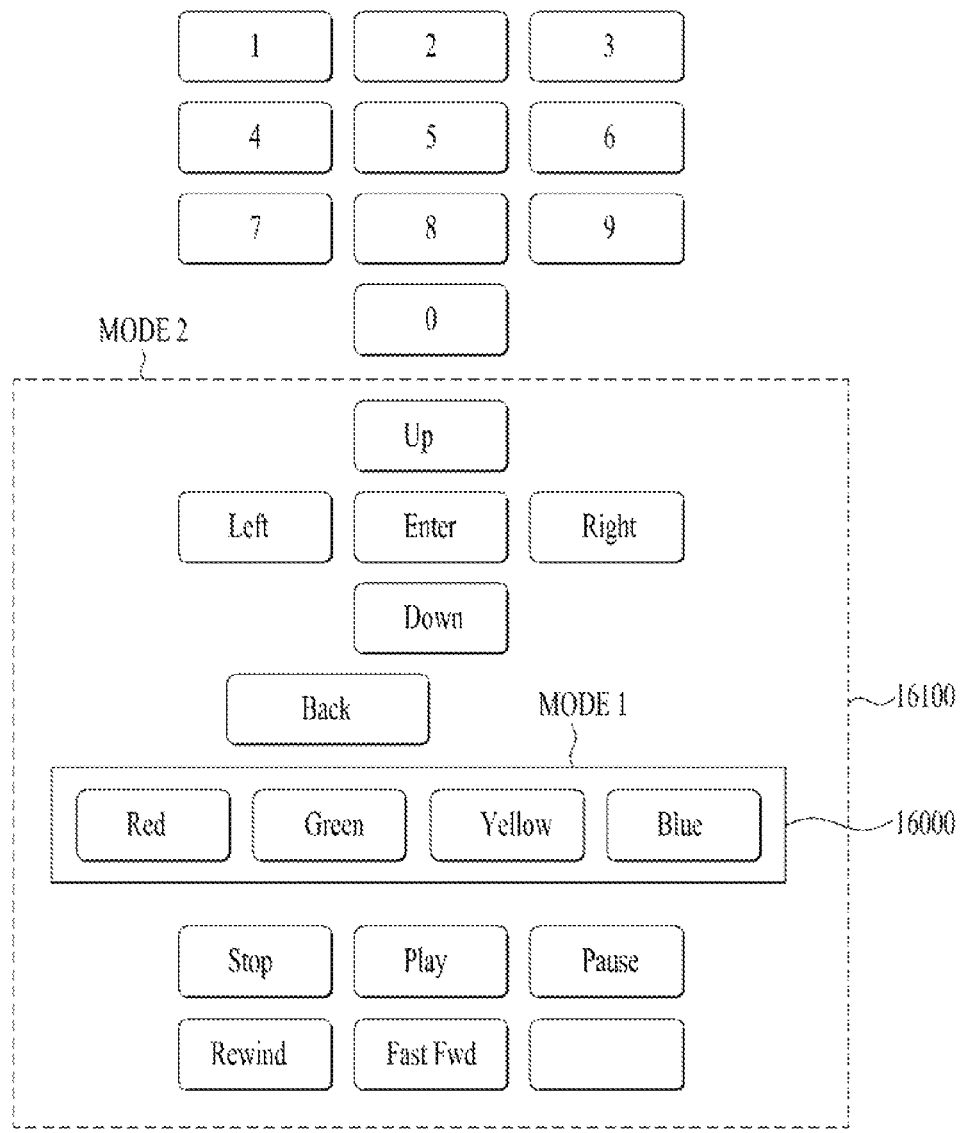
FIG. 16 is a diagram illustrating an input button of a remote controller, associated with a mode, according to an embodiment of the present invention.

FIG. 16 is a diagram illustrating an input button of a remote controller, associated with a mode, according to an embodiment of the present invention.

As described above, a SetAppMode API of Table 3 above may include modes indicating respective application states and keys corresponding to the respective modes. As illustrated in FIG. 16, the input button of the remote controller may be divided into input buttons 16000 corresponding to a mode value of 1 and input buttons 16100 corresponding to a mode value of 2.

The input buttons 16000 corresponding to a mode value of 1 may include a color key (red, green, yellow, and blue), which may be changed according to designer's intention.

The input buttons 16100 corresponding to a mode value of 2 may include a color key, a navigation key (left, right, up, and down), an enter key, a reproduction key (stop, pause, rewind, play, and fast FWD), etc. The case corresponding to a mode value of 2 may be divided into a state in which actual content of the application is displayed on a partial region of the screen, and a state in which actual content of the application is displayed on an entire region of the screen. Thus, when actual content of the application is displayed on an entire region of the screen, the key value may further include input buttons such as a number, and so on, which may be changed according to designer's intention.

Figure 17:
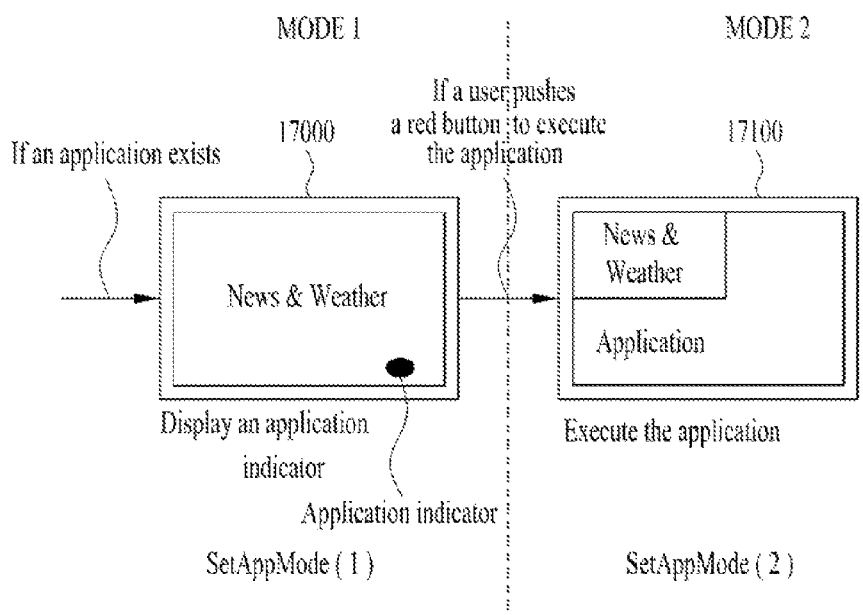
FIG. 17 is a diagram illustrating an operation of a digital service signal processing apparatus according to an embodiment of the present invention.

FIG. 17 is a diagram illustrating an operation of a digital service signal processing apparatus according to an embodiment of the present invention.

FIG. 17 is a diagram illustrating the operation of the digital service signal processing apparatus when configuration of an application mode is changed according to an application state according to an embodiment of the present invention.

As illustrated in FIG. 17, when an application exists, the digital service signal processing apparatus according to the present embodiment may display an application indicator together with current program content (17000). In this case, an application may have an application mode of 1 through the aforementioned API (SetAppMode 1) of Table 3 above and may request or configure a key value corresponding to the mode value to the digital service signal processing apparatus. Then, when the user inputs the input information using an input device such as a remote controller and so on, the digital service signal processing apparatus according to the present embodiment may determine whether the input information of the user corresponds to the key value of the application. Upon determining that the input information corresponds to the key value of the application, the digital service signal processing apparatus according to the present embodiment may process or execute the application according to the corresponding input information. In FIG. 17, a user inputs a red button, and thus, the digital service signal processing apparatus may execute the application and display content of the application together with a current program (17100). Then, in this case, the application may have an application mode of 2 through the aforementioned API(SetAppMode 2) of Table 3 above and may request or configure a key value corresponding to the mode value to the digital service signal processing apparatus. Then, when the user inputs the input information using an input device such as a remote controller and so on, the digital service signal processing apparatus according to the present embodiment may determine whether the input information of the user corresponds to the key value of the application. Upon determining that the input information corresponds to the key value of the application, the digital service signal processing apparatus according to the present embodiment may process or execute the application according to the corresponding input information.

Figure 18:
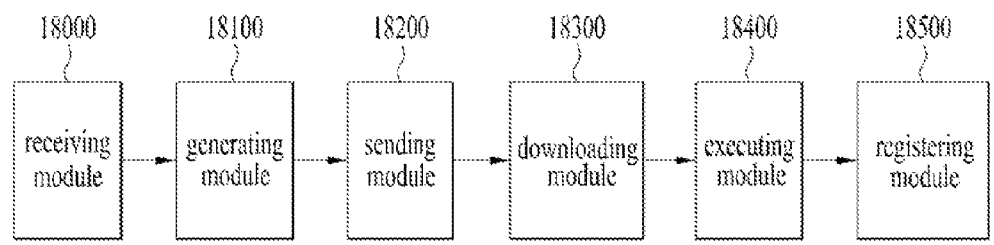
FIG. 18 is a diagram illustrating a digital service signal processing apparatus according to an embodiment of the present invention.

FIG. 18 is a diagram illustrating a digital service signal processing apparatus according to an embodiment of the present invention.

The digital service signal processing apparatus according to the present embodiment may include the aforementioned DTV receiver or the hybrid TV system described with reference to FIGS. 1 and 2.

The digital service signal processing apparatus according to the present embodiment may include a receiving module 18000, a generating module 18100, a sending module 18200, a downloading module 18300, an executing module 18400, and a registering module 18500. Hereinafter, the digital service signal processing apparatus will be described in terms of an operation of each module.

The receiving module 18000 according to the present embodiment may receive signaling information. As described with reference to FIG. 1, when the signaling information is transmitted via a broadcast network, the signaling information may include application signaling information for receiving an application. In addition, in this case, the signaling information may include a service signaling table including a VCT and an EIT. The service signaling table may include A/V data of a real time broadcast service and channel information associated with an application. In addition, as described with reference to FIG. 2, the signaling information may not include application signaling information.

Then, the generating module 18100 according to the present embodiment may generate a request using the channel information included in the service signaling table. In detail, the generating module 18100 according to the present embodiment may acquire channel information, time information of a current broadcast program, and so on from the service signaling table. Then, the generating module 18100 according to the present embodiment may generate an HTTP request sentence using the channel information, the current broadcast program, and so on. The HTTP request sentence may be formed by combining a parent domain name, specific media, major channel number, minor channel number, and so on, such as http://www.ohtv.org?ch=9-1&time=2012-11-10-13:10& . . . , which may be changed according to designer's intention.

Then, the sending module 18200 according to the present embodiment may transmit the generated request. As described above, the sending module 18200 according to the present embodiment may transmit a request signal for transmitting the HTTP request to a DNS server. In this case, the receiving module 18000 according to the present embodiment may receive application signaling information corresponding to the request signal from the DNS server. As described with reference to FIGS. 3 to 9, the application signaling information may include location information and so on such as application URL information.

Then, the downloading module 18300 according to the present embodiment may download an application corresponding to the received application signaling information using the received application signaling information. In this case, the downloading module 18300 according to the present embodiment may determine whether the application corresponding to the received application signaling information is currently stored, using the received application signaling information. As described with reference to FIGS. 4 to 6 and 8 to 9, the downloading module 18300 may determine whether an application associated with the received application signaling information is equal to a pre-stored or currently executed application and determine whether an application associated with the received application signaling information is valid for a current channel, using the received application signaling information. In addition, upon determining that the application associated with the received application signaling information is not equal to the pre-stored or currently executed application and the application associated with the received application signaling information is valid, the downloading module 18300 may stop executing the currently executed application. As the determination result, when the application is not stored, the downloading module 18300 may download the application using the application URL information contained in the received application signaling information.

Then, the executing module 18400 according to the present embodiment may execute an API associated with the downloaded application. As described above, the application is associated with the API described with reference to FIGS. 12 to 17. That is, the digital service signal processing apparatus according to the present embodiment may receive input information through an input device. The input information according to the present embodiment may include a user input signal and so on that are input by pressing a specific key of a remote controller. An application being executed by the digital service signal processing apparatus may receive the input information to perform an operation according to the input information and return control regarding a key of the remote controller, corresponding to the input information, to the DTV receiver so as to allow the DTV receiver to perform an operation associated with the corresponding key. The application according to the present embodiment may use the API described with reference to FIGS. 12 to 17 and Tables 1 to 3 in order to transmit corresponding input information to an application only when input information of an input device, to be processed in a corresponding application, is pre-configured for the DTV receiver per application and the corresponding input information is input to the DTV receiver. In particular, the application according to the present embodiment may use the SetAppMode API in order to configure an application mode and input information defined per mode for a DTV receiver. As described above, the SetAppMode API may represent application states by respective modes and may be used to pre-define input information of the application according to each mode and then to request or configure the input information defined per mode to the device as the application mode is changed. As described above, an integer value indicating a mode is referred to as a mode number, and mode numbers and a key set configured per mode number may be collectively referred to as mode information, which may be changed according to designer's intention.

A detailed description thereof is the same as in FIGS. 12 to 17 and thus is not given here.

Then, the registering module 18500 according to the present embodiment may store the key set configure per mode number of the aforementioned SetAppMode API.

Figure 19:
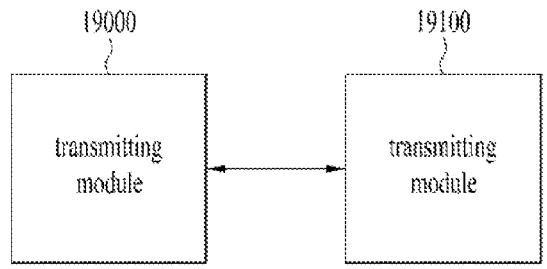
FIG. 19 is a diagram illustrating a digital service signal processing apparatus according to another embodiment of the present invention.

FIG. 19 is a diagram illustrating a digital service signal processing apparatus according to another embodiment of the present invention.

FIG. 19 illustrates a digital service signal processing apparatus according to another embodiment of the present invention in terms of a transmitting side. As described above, the digital service signal processing apparatus according to the present embodiment may include the aforementioned DTV receiver or the hybrid TV system described with reference to FIGS. 1 and 2.

The digital service signal processing apparatus according to the present embodiment may include a transmitting module 19000 and a receiving module 19100. Hereinafter, the digital service signal processing apparatus will be described in terms of an operation of each module.

The transmitting module 19000 according to the present embodiment may generate and transmit signaling information. As described with reference to FIGS. 1 and 2, the signaling information may include application signaling information for receiving an application. In addition, in this case, the signaling information may include a service signaling table including a VCT and an EIT. The service signaling table may include channel information associated with an application and A/V data of a real-time broadcast service. In addition, as described with reference to FIG. 2, the signaling information may not include application signaling information.

Then, the receiving module 19100 according to the present embodiment may receive a request associated with channel information. In detail, the request according to the present embodiment may be generated using channel information, time information of a current broadcast program, and so on from the service signaling table. In particular, the request according to the present embodiment may include an HTTP request sentence. The HTTP request sentence may be formed by combining a parent domain name, specific media, major channel number, minor channel number, and so on, such as http://www.ohtv.org?ch=9-1&time=2012-11-10-13:10& . . . , which may be changed according to designer's intention.

Then, the transmitting module 19000 may transmit application signaling information associated with a digital service signal according to the received request. As described with reference to FIGS. 3 to 9, the application signaling information may include location information and so on such as application URL information.

As described above, the application according to the present embodiment is associated with the API described with reference to FIGS. 12 to 17. That is, the digital service signal processing apparatus according to the present embodiment may receive input information through an input device. The input information according to the present embodiment may include a user input signal and so on that are input by pressing a specific key of a remote controller. An application being executed by the digital service signal processing apparatus may receive the input information to perform an operation according to the input information and return control regarding a key of the remote controller, corresponding to the input information, to the DTV receiver so as to allow the DTV receiver to perform an operation associated with the corresponding key. The application according to the present embodiment may use the API described with reference to FIGS. 12 to 17 and Tables 1 to 3 in order to transmit corresponding input information to an application only when input information of an input device, to be processed in a corresponding application, is pre-configured for the DTV receiver per application and the corresponding input information is input to the DTV receiver. In particular, the application according to the present embodiment may use the SetAppMode API in order to configure an application mode and input information defined per mode for a DTV receiver. As described above, the SetAppMode API may represent application states by respective modes and may be used to pre-define input information of the application according to each mode and then to request or configure the input information defined per mode to the device as the application mode is changed. As described above, an integer value indicating a mode is referred to as a mode number, and mode numbers and a key set configured per mode number may be collectively referred to as mode information, which may be changed according to designer's intention.

A detailed description thereof is the same as in FIGS. 12 to 17 and thus is not given here.

Figure 20:
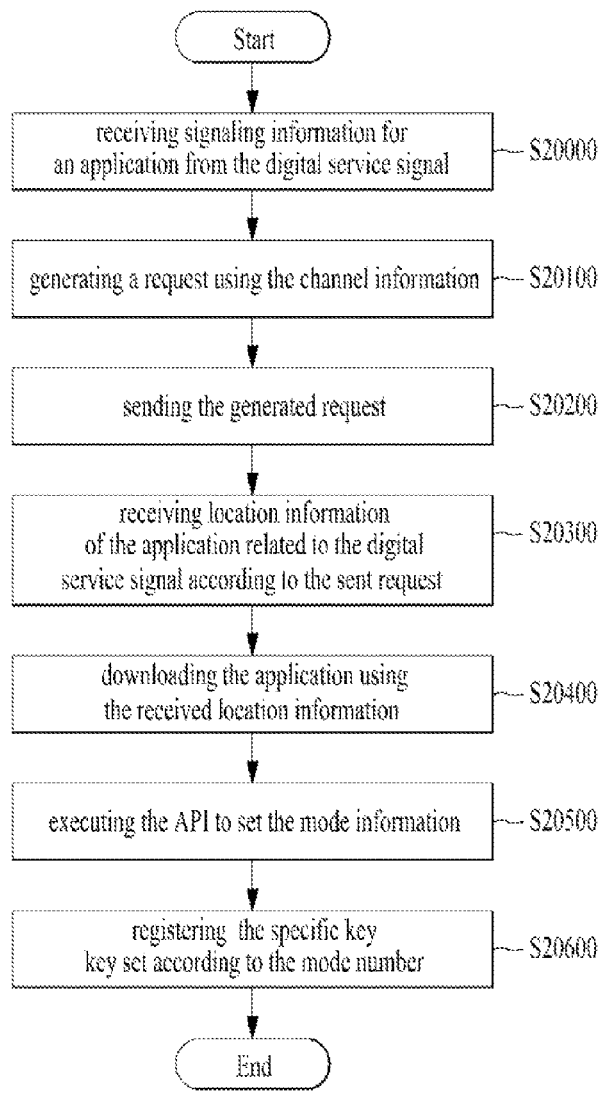
FIG. 20 is a flowchart of a digital service signal processing method according to another embodiment of the present invention.

FIG. 20 is a flowchart of a digital service signal processing method according to another embodiment of the present invention.

The digital service signal processing apparatus according to the present embodiment may include the aforementioned DTV receiver or the hybrid TV system described with reference to FIGS. 1 and 2.

The digital service signal processing apparatus according to the present embodiment may receive signaling information from a digital service signal (S20000). As described with reference to FIG. 18, the receiving module 18000 included in the digital service signal processing apparatus according to the present embodiment may receive signaling information via a broadcast network. As described with reference to FIG. 1, when the signaling information is transmitted through the broadcast network, the signaling information may include application signaling information for receiving an application. In addition, in this case, the signaling information may include a service signaling table including a VCT and an EIT. The service signaling table may include channel information associated with an application and A/V data of a real-time broadcast service. In addition, as described with reference to FIG. 2, the signaling information may not include application signaling information.

Then, the digital service signal processing apparatus according to the present embodiment may generate a request using the channel information contained in the service signaling table (S20100). In detail, as described with reference to FIG. 18, a generating module included in the digital service signal processing apparatus according to the present embodiment may acquire channel information, time information of a current broadcast program, and so on from the service signaling table. Then, the digital service signal processing apparatus according to the present embodiment may generate an HTTP request sentence using the channel information, the current broadcast program, and so on. The HTTP request sentence may be formed by combining a parent domain name, specific media, major channel number, minor channel number, and so on, such as http://www.ohtv.org?ch=9-1&time=2012-11-10-13:10& . . . , which may be changed according to designer's intention.

Then, the digital service signal processing apparatus according to the present embodiment may transmit the generated request (S20200). As described with reference to FIG. 18, the sending module 18200 according to the present embodiment may transmit a request signal for transmitting the HTTP request to a DNS server.

Then, the digital service signal processing apparatus according to the present embodiment may receive application signaling information corresponding to the request signal from the DNS server (S20300). As described with reference to FIGS. 3 to 9, the application signaling information may include location information and so on such as application URL information.

Then, the digital service signal processing apparatus according to the present embodiment may download an application corresponding to the received application signaling information using the received application signaling information (S20400). In this case, the digital service signal processing apparatus according to the present embodiment may determine whether the application corresponding to the received application signaling information is currently stored, using the received application signaling information. As described with reference to FIGS. 4 to 6 and 8 to 9, the digital service signal processing apparatus may determine whether an application associated with the received application signaling information is equal to a pre-stored or currently executed application and determine whether an application associated with the received application signaling information is valid for a current channel, using the received application signaling information. In addition, upon determining that the application associated with the received application signaling information is not equal to the pre-stored or currently executed application and the application associated with the received application signaling information is valid, the digital service signal processing apparatus may stop executing the currently executed application. As the determination result, when the application is not stored, the digital service signal processing apparatus may download the application using the application URL information contained in the received application signaling information.

Then, the digital service signal processing apparatus according to the present embodiment may execute an API associated with the downloaded application (S20500). As described above, the application is associated with the API described with reference to FIGS. 12 to 17. That is, the digital service signal processing apparatus according to the present embodiment may receive input information through an input device. The input information according to the present embodiment may include a user input signal and so on that are input by pressing a specific key of a remote controller. An application being executed by the digital service signal processing apparatus may receive the input information to perform an operation according to the input information and return control regarding a key of the remote controller, corresponding to the input information, to the DTV receiver so as to allow the DTV receiver to perform an operation associated with the corresponding key. The application according to the present embodiment may use the API described with reference to FIGS. 12 to 17 and Tables 1 to 3 in order to transmit corresponding input information to an application only when input information of an input device, to be processed in a corresponding application, is pre-configured for the DTV receiver per application and the corresponding input information is input to the DTV receiver. In particular, the application according to the present embodiment may use the SetAppMode API in order to configure an application mode and input information defined per mode for a DTV receiver. As described above, SetAppMode API may represent application states by respective modes and may be used to pre-define input information of the application according to each mode and then to request or configure the input information defined per mode to the device as the application mode is changed. As described above, an integer value indicating a mode is referred to as a mode number, and mode numbers and a key set configured per mode number may be collectively referred to as mode information, which may be changed according to designer's intention.

A detailed description thereof is the same as in FIGS. 12 to 17 and thus is not given here.

Then, the digital service signal processing apparatus according to the present embodiment may store the key set configure per mode number of the aforementioned SetAppMode API (S20600).

FIG. 21 is a flowchart of a digital service signal processing method according to further another embodiment of the present invention.

FIG. 21 illustrates a digital service signal processing method according to further another embodiment of the present invention in terms of a transmitting side.

The digital service signal processing apparatus according to the present embodiment may generate and transmit signaling information. As described with reference to FIGS. 1 and 2, the signaling information may include application signaling information for receiving an application. In addition, in this case, the signaling information may include a service signaling table including a VCT and an EIT. The service signaling table may include channel information associated with an application and A/V data of a real-time broadcast service. In addition, as described with reference to FIG. 2, the signaling information may not include application signaling information.

Then, the digital service signal processing apparatus according to the present embodiment may receive a request associated with channel information. In detail, the request according to the present embodiment may be generated using channel information, time information of a current broadcast program, and so on from the service signaling table. In particular, the request according to the present embodiment may include an HTTP request sentence. The HTTP request sentence may be formed by combining a parent domain name, specific media, major channel number, minor channel number, and so on, such as http://www.ohtv.org?ch=9-1&time=2012-11-10-13:10& . . . , which may be changed according to designer's intention.

Then, the digital service signal processing apparatus according to the present embodiment may transmit application signaling information associated with a digital service signal according to the received request. As described with reference to FIGS. 3 to 9, the application signaling information may include location information and so on such as application URL information.

As described above, the application according to the present embodiment is associated with the API described with reference to FIGS. 12 to 17. That is, the digital service signal processing apparatus according to the present embodiment may receive input information through an input device. The input information according to the present embodiment may include a user input signal and so on that are input by pressing a specific key of a remote controller. An application being executed by the digital service signal processing apparatus may receive the input information to perform an operation according to the input information and return control regarding a key of the remote controller, corresponding to the input information, to the DTV receiver so as to allow the DTV receiver to perform an operation associated with the corresponding key. The application according to the present embodiment may use the API described with reference to FIGS. 12 to 17 and Tables 1 to 3 in order to transmit corresponding input information to an application only when input information of an input device, to be processed in a corresponding application, is pre-configured for the DTV receiver per application and the corresponding input information is input to the DTV receiver. In particular, the application according to the present embodiment may use the SetAppMode API in order to configure an application mode and input information defined per mode for a DTV receiver. As described above, the SetAppMode API may represent application states by respective modes and may be used to pre-define input information of the application according to each mode and then to request or configure the input information defined per mode to the device as the application mode is changed. As described above, an integer value indicating a mode is referred to as a mode number, and mode numbers and a key set configured per mode number may be collectively referred to as mode information, which may be changed according to designer's intention.

A detailed description thereof is the same as in FIGS. 12 to 17 and thus is not given here.

According to an embodiment of the present invention, a method and apparatus for processing a digital service signal may effectively manage a database associated with application signaling information According to an embodiment of the present invention, a method and apparatus for processing a digital service signal may control a lifecycle of an application associated with a corresponding broadcast program according to change in broadcast program and so on.

According to an embodiment of the present invention, a method and apparatus for processing a digital service signal may effectively process information input from an input device such as a remote controller, etc. by an application.

According to an embodiment of the present invention, a method and apparatus for processing a digital service signal may configure an application state and effectively process the input information so as to process the input information input from the input device such as the remote controller, etc. according to the application state.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of processing a digital service signal, the method comprises:
    receiving signaling information for an application from the digital service signal by a receiver, wherein the signaling information includes a service signaling table having channel information;
    generating a request using the channel information by a generator;
    sending the generated request by a sending module;
    receiving location information of the application related to the digital service signal according to the sent request by the receiver;
    downloading the application using the received location information by a downloader, wherein the application is associated with an API (Application Programming Interface) to set mode information indicating a display status of the application, wherein the mode information includes a mode number indicating the display status of the application and a key set indicating keys which are needed in the display status of the application, wherein the key set is changed when the display status of the application is changed, wherein the display status of the application is a full display or an icon display,
    wherein the full display indicates that actual contents of the application are displayed on a screen and the icon display indicates that only an indicator of the application is displayed on a screen;
    executing the API to set the mode information by an executer; and
    registering the key set according to the mode number by a register.

2. The method of claim 1 further includes processing an input signal according to the registered key set.

3. The method of claim 1, wherein the mode number indicates the icon display of the application, the key set includes color keys.

4. The method of claim 1, wherein the mode number indicates the full display of the application, the key set includes color, navigation, enter, back and play-control keys.

5. The method of claims 3 and 4, when the display status of the application is changed, the method further includes:
    executing the API to set mode information according to the changed display status of the application by the executer; and
    registering the key set according to the changed display status of the application by the register.

6. The method of claim 1, when a key is input from the input device, the method further includes:
    checking whether the application is running;
    determining whether the application has the key set; and
    determining whether the key set of the application in the display status has the input key;
    transmitting a key event according to the input key to the application.

7. An apparatus of processing a digital service signal, comprising:

a receiver to receive signaling information for an application from the digital service signal, wherein the signaling information includes a service signaling table having channel information;
   a generator to generate a request using the channel information;
   a sending module to send the generated request, wherein the receiving module receives location information according to the sent request;
   a downloader to download the application using the received location information, wherein the application is associated with an API (Application Programming Interface) to set the mode information indicating a display status of the application, wherein the mode information includes a mode number indicating the display status of the application and a key set indicating keys which are needed in the display status of the application, wherein the key set is changed when the display status of the application is changed, wherein the display status of the application is a full display or an icon display,
   wherein the full display indicates that actual contents of the application are displayed on a screen and the icon display indicates that only an indicator of the application is displayed on a screen;
   an executer to execute the API to set the mode information; and
   a register to register the key set according to the mode number.

8. The apparatus of claim 7 further includes a processor to process an input signal according to the registered key set.

9. The apparatus of claim 7, wherein the mode number indicates the icon display of the application, the key set includes color keys.

10. The apparatus of claim 7, wherein the mode number indicates the full display of the application, the key set includes color, navigation, enter, back and play-control keys.

11. The apparatus of claims 9 and 10, when the display status of the application is changed, the executing module further executes the API to set mode information according to the changed display status of the application and the registering module further registers the key set according to the changed display status of the application.

12. A method of processing a digital service signal, the method comprises:
   transmitting signaling information for an application with the digital service signal by a transmitter, wherein the signaling information includes a service signaling table having channel information;
   receiving a request related to the channel information by a receiver; and
   transmitting location information of the application related to the digital service signal according to the received request by the transmitter,
   wherein the application is associated with an API (Application Programming Interface) to set mode information indicating a display status of the application, wherein the mode information includes a mode number indicating the display status of the application and a key set indicating keys which are needed in the display status of the application, wherein the key set is changed when the display status of the application is changed, wherein the display status of the application is a full display or an icon display,
   wherein the full display indicates that actual contents of the application are displayed on a screen and the icon display indicates that only an indicator of the application is displayed on a screen.

13. The method of claim 12, the registered key set is related to an input signal.

14. The method of claim 12, wherein the mode number indicates the icon display of the application, the key set includes color keys.

15. The method of claim 12, wherein the mode number indicates the full display of the application, the key set includes color, navigation, enter, back and play-control keys.

16. The method of claims 14 and 15, when the display status of the application is changed, the API set mode information according to the changed display status of the application.

17. An apparatus of processing a digital service signal, comprising:
   a transmitter to transmit signaling information for an application with the digital service signal and location information of the application related to the digital service signal, wherein the signaling information includes a service signaling table having channel information; and
   a receiver to receive a request related to the channel information, wherein the transmitter transmits location information of the application according to the received request,
   wherein the application is associated with an API (Application Programming Interface) to set the mode information indicating a display status of the application, wherein the mode information includes a mode number indicating the display status of the application and a key set indicating keys which are needed in the display status of the application, wherein the key set is changed when the display status of the application is changed, wherein the display status of the application is a full display or an icon display,
   wherein the full display indicates that actual contents of the application are displayed on a screen and the icon display indicates that only an indicator of the application is displayed on a screen.

18. The apparatus of claim 17, the registered key set is related to an input signal.

19. The apparatus of claim 17, wherein the mode number indicates the icon display of the application, the key set includes color keys.

20. The apparatus of claim 17, wherein the mode number indicates the full display of the application, the key set includes color, navigation, enter, back and play-control keys.

21. The apparatus of claims 19 and 20, when the display status of the application is changed, the API set mode information according to the changed display status of the application.

* * * * *